US012577505B2

(12) United States Patent
Ludwig et al.

(10) Patent No.: US 12,577,505 B2
(45) Date of Patent: Mar. 17, 2026

(54) GRANULES COMPRISING PROTONATED TRIAZACYCLIC COMPOUNDS AND BLEACHING AGENT AND CLEANING AGENT COMPRISING THE SAME

(71) Applicant: Catexel GmbH, Wiesbaden (DE)

(72) Inventors: Rolf Ludwig, Eppstein (DE); Yfranka Roelofsen, Leiden (NL); Ronald Hage, Leiden (NL); Judith Preuschen, Sörgenloch (DE); Roman Morschhäuser, Mainz (DE); Said Kchirid, Heidenbrücken (DE)

(73) Assignee: Catexel GmbH (DE)

(*) Notice: Subject to any disclaimer, the term of this patent is extended or adjusted under 35 U.S.C. 154(b) by 337 days.

(21) Appl. No.: 18/265,588

(22) PCT Filed: Oct. 19, 2021

(86) PCT No.: PCT/EP2021/000126

§ 371 (c)(1),
(2) Date: Jun. 6, 2023

(87) PCT Pub. No.: WO2022/122177

PCT Pub. Date: Jun. 16, 2022

(65) Prior Publication Data

US 2024/0034962 A1 Feb. 1, 2024

(30) Foreign Application Priority Data

Dec. 7, 2020 (EP) .................................... 20000441

(51) Int. Cl.
*C11D 3/00* (2006.01)
*C11D 3/39* (2006.01)
*C11D 3/395* (2006.01)

(52) U.S. Cl.
CPC .......... *C11D 3/3935* (2013.01); *C11D 3/3917* (2013.01); *C11D 3/392* (2013.01); *C11D 3/3953* (2013.01); *C11D 2111/14* (2024.01)

(58) Field of Classification Search
CPC ..... C11D 3/3935; C11D 3/3917; C11D 3/392; C11D 3/3953; C11D 2111/14; C11D 3/222; C11D 3/28; C07D 255/02
USPC .......................................................... 510/224
See application file for complete search history.

(56) References Cited

U.S. PATENT DOCUMENTS

| | | | | |
|---|---|---|---|---|
| 1,246,339 | A | 11/1917 | Smit | |
| 3,332,882 | A | 7/1967 | Blumbergs et al. | |
| 4,128,494 | A | 12/1978 | Schirmann et al. | |
| 4,412,934 | A | 11/1983 | Chung et al. | |
| 4,675,393 | A | 6/1987 | Coxon | |
| 6,579,839 | B2 | 6/2003 | Price et al. | |
| 2016/0160160 | A1* | 6/2016 | Gaulard | C11D 3/3935 252/186.41 |
| 2020/0172838 | A1* | 6/2020 | Barreleiro | C11D 3/3907 |

FOREIGN PATENT DOCUMENTS

| | | | | |
|---|---|---|---|---|
| DE | 102017004742 A1 * | 11/2018 | | C11D 11/0023 |
| EP | 0902021 A2 * | 3/1999 | | C11D 3/28 |

OTHER PUBLICATIONS

STIC Search Report dated Jul. 3, 2025.*

* cited by examiner

*Primary Examiner* — Eisa B Elhilo
(74) *Attorney, Agent, or Firm* — M. Susan Spiering; Ochoa & Associates, P.C.

(57) ABSTRACT

The present invention concerns a granule comprising Mn(II) oxalate, a protonated salt of a cyclic triamine, a polysaccharide absorbent and a coating agent. In another embodiment the invention concerns a granule comprising a polysaccharide absorbent, a protonated salt of a cyclic triamine and no or very small amounts of Mn. The invention also concerns methods of preparing said granules comprising Mn(II) oxalate, polysaccharide absorbent and such salts or comprising polysaccharide absorbent, such salts and no Mn compound and bleaching formulations comprising the granules and a peroxy compound or a precursor thereof. Granules comprising Mn(II) oxalate, polysaccharide absorbent and the salt or comprising polysaccharide absorbent, the salt and no Mn compound, and formulations comprising these are suitable for use in catalysing oxidation, for example as a component of a dishwasher bleaching composition. The invention further relates to methods of oxidising with the bleaching formulations described herein.

19 Claims, No Drawings

GRANULES COMPRISING PROTONATED TRIAZACYCLIC COMPOUNDS AND BLEACHING AGENT AND CLEANING AGENT COMPRISING THE SAME

CLAIM FOR PRIORITY

This application is a national phase application of PCT/EP 2021/000126, filed 19 Oct. 2021, which was based on application EP 20000441.4, filed 7 Dec. 2020. The priorities of PCT/EP 2021/000126 and EP 20000441.4 are hereby claimed and their disclosures incorporated by reference herein.

FIELD OF THE INVENTION

The present invention concerns granules that comprise a protonated cyclic triamine compound and other ingredients.

The invention also concerns bleaching formulations comprising said granules and a peroxy compound or a precursor thereof. The granules and formulations comprising said granules are suitable for use in catalysing oxidation or bleaching, for example as a component of an automatic dishwasher bleaching composition.

BACKGROUND

Manganese catalysts based on triazacyclononane ligands are known to be active catalysts in the bleaching of stains in laundry detergent products and in dishwash products and for treatment of cellulosic substrates in e.g. wood-pulp or raw cotton (see for example EP 0 458 397 A2 (Unilever NV and Unilever plc) and WO 2006/125517 A1 (Unilever plc et al.).

Since these catalysts are very effective, only small amounts of them need to be used in bleaching detergent or dishwash formulations, often at levels less than 0.1 wt % in the detergent or dishwasher formulation. A difficulty arising from the use of such low dosing is achieving accurate dosing of the catalyst and homogeneous distribution throughout the formulation. When distribution of the catalyst is heterogeneous in a formulation, the use of such detergent formulations in a washing machine or in handwashing can lead to underdosing (i.e. giving a poorer bleaching performance) or overdosing of the catalyst (i.e. giving rise to excessive hydrogen peroxide decomposition and possibly brown spotting). A well-known approach to circumvent this potential problem is the presentation/inclusion of the solid catalyst on a solid support in bleaching formulations. Non-limiting examples of approaches to develop stable granules comprising bleach catalyst compositions are EP 0 544 440 A2, WO 94/21777 A1, WO 95/06710 A1 (all Unilever N.V. and Unilever plc), WO2018/011596 (Itaconix Ltd), WO2018/210442 (Weylchem Wiesbaden GmbH), EP3167036B and WO2016/177439 (both Novozymes A/S), EP2966161A and WO2017/118543 (both Dalli Werke GmbH).

In general, a disadvantage of the approach of using granules comprising the manganese bleach catalysts is that these will be intensely coloured. For example the granules of $[Mn^{IV}Mn^{IV}(\mu\text{-}O)_3(Me_3\text{-}TACN)_2](PF_6)_2$ ($Me_3$-TACN=1,4,7-trimethyl-1,4,7-triazacyclononane) are clearly red/pink coloured which for certain detergent formulations will not be optimal. The advantage of using $[Mn^{IV}Mn^{IV}(\mu\text{-}O)_3(Me_3\text{-}TACN)_2](PF_6)_2$ is that this complex is relatively stable, thanks to the presence of kinetically slow Mn(IV) ions. Inclusion of palely coloured or even colourless granules would be appealing. In general only Mn(II) salts are (nearly) colourless, but these suffer often from instability during storage, especially in alkaline oxidative environments, which leads to formation of brown $MnO_2$ matter.

WO2010/022918 A1 (Clariant International Ltd) cover the use of Mn(II) oxalate as bleaching catalysts, which showed enhanced stability and activity compared to other Mn(II) salts. It was observed that the solubility of Mn(II) oxalate in water is very low.

EP0549271 B1 (Unilever PLC and Unilever N.V.) describe the use of the $Me_3$-TACN ligand, optionally as a protonated salt, in conjunction with a Mn source, such as $Mn(nitrate)_2$ or a Mn-$Me_3$-TACN containing complex to enhance bleaching activity of hydrogen peroxide.

It is known that using the $Me_3$-TACN ligand salt without any source of Mn in the detergent bleaching formulation an enhancement of the bleaching activity by hydrogen peroxide can be found. The presence of manganese ions in certain stains leads to binding of the ligand to the Mn ions and then bleach-active species are formed. EP0902021 A2 (Clariant GmbH) describes the use of cyclic polyamine salts, such as the monoprotonated $Me_3$-TACN ligand salts in detergent formulations to enhance bleaching performance by hydrogen peroxide. This reference discloses addition of $Me_3$HTACN-hydrogen sulfate to a sodium percarbonate containing base detergent and investigation of the bleaching performance of the detergent. Moreover, the use of the non-protonated $Me_3$-TACN ligand in detergent formulations for the same application has been covered in a patent application from Rhodia Operations (WO2018/141237 A1). The experiments given in said patent showed that addition of non-protonated $Me_3$-TACN ligand to detergent formulations with sodium percarbonate yield improved stain bleaching activity.

Reinhardt et al. describe in Household and Personal Care Today, vol. 9, no. 4, pp. 54-57 (2014), ligand salts as metal-free bleach boosters for laundry applications. Disclosed are protonated $Me_3$TACN salts, in particular a series of monoprotonated $Me_3$TACN salts, such as with $HSO_4^-$, $PF_6^-$, $BF_4^-$, $ClO_4^-$, oxalate, acetate, citrate and polyacrylic acid. Also one diprotonated salt, $Me_3$TACN*2HCl, has been disclosed in the same publication. This document discloses as one embodiment ligand salts in granular form, preferred as co-granules with enzymes, bleach activators or sodium percarbonate. No details about the composition of these granules or co-granules are given nor are there any data about their properties, such as storage stability or bleaching activity.

There remains a need in the art of bleaching formulations, for example of use in dishwashing applications, to include colourless or palely coloured granules that show good storage stability and high bleaching activity. The present invention is intended to address these needs.

SUMMARY OF THE INVENTION

We have surprisingly found that granules comprising a protonated cyclic triamine compound and other ingredients show very high bleaching activity for useful periods of storage time.

In one embodiment, the use of polysaccharide absorbent, of Mn(II) oxalate rather than other commercially available Mn(II) salts in combination with protonated cyclic polyamine compound salts provides storage stable granules and detergent compositions thereof, yet providing high bleaching activity.

Viewed from a first aspect, therefore, the invention provides a granule, that comprises a coating agent, a polysaccharide absorbent, 0.02-25 wt-% Mn(II) oxalate, and 0.1-25 wt-% of a salt of composition $[HL]^+(X^{i-})_{1/i}$, $[H_2L]^{2+}(X^{i-})_{2/i}$, $[H_3L]^{3+}(X^{i-})_{3/i}$, $[(HL\text{-}BG\text{-}LH)]^{2+}(X^{i-})_{2/i}$, $[(HL\text{-}BG\text{-}LH_2)]^{3+}(X^{i-})_{3/i}$, $[(H_2L\text{-}BG\text{-}LH_2)]^{4+}(X^{i-})_{4/i}$, $[(H_3L\text{-}BG\text{-}LH_2)]^{5+}(X^{i-})_{5/i}$, and/or $[(H_3L\text{-}BG\text{-}LH_3)]^{6+}(X^{i-})_{6/i}$, whereby L is a monocyclic triamine and BG is a divalent organic bridge group linking two L-groups, i is 1 or 2, and $X^{i-}$ is a mono- or divalent anion, preferably an anion selected from the group consisting of $Cl^-$, $Br^-$, $I^-$, $NO_3^-$, $ClO_4^-$, $PF_6^-$, $BF_4^-$, $OCN^-$, $SCN^-$, $SO_4^{2-}$, $R'SO_4^-$, $R'COO^-$, R"oxalate$^-$, oxalate$^{2-}$, $CF_3SO_3^-$ and $R'SO_3^-$, whereby R' is selected from hydrogen, $C_1$-$C_8$ alkyl, phenyl and methyl substituted phenyl, and whereby R" is selected from H, Na, K and Li.

L is preferably a monocyclic triamine and L-BG-L is preferably two monocyclic triamines linked via a divalent organic bridge group, more preferred L is a monocyclic triamine of formula (1) and L-BG-L is a dicyclic triamine of formula (2):

(1)

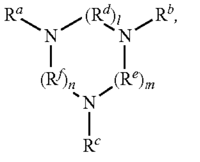

(2)

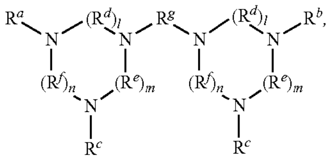

wherein $R^a$, $R^b$ and $R^c$ independently of one another are hydrogen, alkyl or aryl which may be substituted with alkyl, alkoxy, hydroxyl, sulfo or carboxyl groups or with halogen atoms, $R^d$, $R^e$ and $R^f$ are a —$CR^hR^i$— group, $R^g$ is a $C_2$-$C_6$ alkylene bridge, a $C_6$-$C_{10}$ arylene bridge or a bridge comprising one or two $C_1$-$C_3$ alkylene units and one $C_6$-$C_{10}$ arylene unit, which bridge may be optionally substituted one or more times with independently selected $C_1$-$C_{24}$ alkyl groups, $R^h$ and $R^i$ independently of one another are hydrogen, alkyl or aryl which may be substituted with alkyl, alkoxy, hydroxyl, sulfo or carboxyl groups or with halogen atoms, and l, m and n independently of one another are 1, 2, 3 or 4.

Most preferred L is a ring of formula (I) and L-BG-L is two rings of formula (I) linked via an organic divalent group RB:

(I)

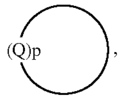

wherein:

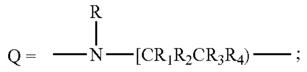

p is 3;

R is independently selected from the group consisting of hydrogen, $C_1$-$C_{24}$alkyl, $CH_2CH_2OH$ and $CH_2COOH$; or one R is linked as a divalent group RB to the nitrogen atom of another Q of another ring of formula (I), wherein RB is selected from a $C_2$-$C_6$ alkylene bridge, a $C_6$-$C_{10}$ arylene bridge or a bridge comprising one or two $C_1$-$C_3$ alkylene units and one $C_6$-$C_{10}$ arylene unit, which bridge may be optionally substituted one or more times with independently selected $C_1$-$C_{24}$ alkyl groups;

$R_1$, $R_2$, $R_3$, and $R_4$ are independently selected from H, $C_1$-$C_4$alkyl and $C_1$-$C_4$-alkylhydroxy.

In another embodiment, the use of a polysaccharide absorbent, of protonated mono- or dicyclic triamine compounds in combination with low amounts of Mn-containing compounds or in the absence of Mn-containing compounds, provides storage stable granules and detergent compositions thereof, yet providing high bleaching activity.

Viewed from a second aspect, the invention provides a granule that comprises a polysaccharide absorbent, between 0.02-25 wt-% of a salt of composition $[HL]^+(X^{i-})_{1/i}$, $[H_2L]^{2+}(X^{i-})_{2/i}$, $[H_3L]^{3+}(X^{i-})_{3/i}$, $[(HL\text{-}BG\text{-}LH)]^{2+}(X^{i-})_{2/i}$, $[(HL\text{-}BG\text{-}LH_2)]^{3+}(X^{i-})_{3/i}$, $[(H_2L\text{-}BG\text{-}LH_2)]^{4+}(X^{i-})_{4/i}$, $[(H_3L\text{-}BG\text{-}LH_2)]^{5+}(X^{i-})_{5/i}$, and/or $[(H_3L\text{-}BG\text{-}LH_3)]^{6+}(X^{i-})_{6/i}$, whereby L is a monocyclic triamine as defined above and BG is a divalent organic bridge group as defined above, preferably L is a ring of formula (I) and L-BG-L is two rings of formula (I) linked via an organic divalent group:

(I)

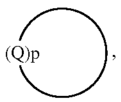

wherein:

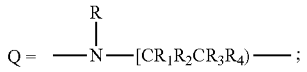

p is 3;

R is independently selected from the group consisting of hydrogen, $C_1$-$C_{24}$-alkyl, $CH_2CH_2OH$ and $CH_2COOH$; or one R is linked to the nitrogen atom of another Q of another ring of formula (I) via a $C_2$-$C_6$ alkylene bridge, a $C_6$-$C_{10}$ arylene bridge or a bridge comprising one or two $C_1$-$C_3$ alkylene units and one $C_6$-$C_{10}$ arylene unit, which bridge may be optionally substituted one or more times with independently selected $C_1$-$C_{24}$ alkyl groups;

$R_1$, $R_2$, $R_3$, and $R_4$ are independently selected from H, $C_1$-$C_4$alkyl and $C_1$-$C_4$-alkylhydroxy;

i is 1 or 2; and wherein $X^{i-}$ is a mono- or divalent anion, preferably an anion selected from $Cl^-$, $Br^-$, $I^-$, $NO_3^-$, $ClO_4^-$, $PF_6^-$, $BF_4^-$, $OCN^-$, $SCN^-$, $SO_4^{2-}$, $R'SO_4^-$, $R'COO^-$, R"oxalate$^-$, oxalate$^{2-}$, $CF_3SO_3^-$ and $R'SO_3^-$, whereby R' is selected from hydrogen, $C_1$-$C_8$ alkyl, phenyl or methyl substituted phenyl, and whereby R" is selected from H, Na, K and Li, and wherein said granule contains less than 0.01 wt-% of Mn.

Viewed from a third aspect, the invention provides a bleaching formulation comprising a granule according to the first or second aspect of the invention.

Viewed from a fourth aspect, the invention provides a method comprising contacting a substrate with water and a bleaching formulation according to the third aspect of the invention.

Viewed from a fifth aspect, the invention provides a method comprising the preparation of the granules according to the first or second aspect of the invention.

Viewed from a sixth aspect, the invention provides salts of formula $[H_2L]^{2+}(Y^{-i-})_{2/i}$ $[H_3L]^{3+}(X^{i-})_{3/i}$, $[(HL\text{-}BG\text{-}LH)]^{2+}(X^{i-})_{2/i}$, $[(HL\text{-}BG\text{-}LH_2)]^{3+}(X^{i-})_{3/i}$, $[(H_2L\text{-}BG\text{-}LH_2)]^{4+}(X^{i-})_{4/i}$, $[(H_3L\text{-}BG\text{-}LH_2)]^{5+}(X^{i-})_{5/i}$, or $[(H_3L\text{-}BG\text{-}LH_3)]^{6+}(X^{i-})_{6/i}$, whereby L is a monocyclic triamine and BG is a divalent organic bridge group as defined above, preferably L is a ring of formula (I) and L-BG-L is two rings of formula (I) linked via a divalent organic group, $Y^{i-}$ is selected from $Br^-$, $I^-$, $NO_3^-$, $ClO_4^-$, $PF_6^-$, $BF_4^-$, $OCN^-$, $SCN^-$, $SO_4^{2-}$, $R'SO_4^-$, $R'COO^-$, $CF_3SO_3^-$ and $R'SO_3^-$, i is 1 or 2; and $X^{i-}$ is a mono- or divalent anion, preferably an anion selected from $Cl^-$, $Br^-$, $I^-$, $NO_3^-$, $ClO_4^-$, $PF_6^-$, $BF_4^-$, $OCN^-$, $SCN^-$, $SO_4^{2-}$, $R'SO_4^-$, $R'COO^-$, R"oxalate$^-$, oxalate$^{2-}$, $CF_3SO_3^-$ and $R'SO_3^-$, whereby R' is selected from hydrogen, $C_1$-$C_8$ alkyl, phenyl or methyl substituted phenyl, and whereby R" is selected from H, Na, K and Li.

Further aspects and embodiments of the present invention will be evident from the discussion that follows below.

DETAILED DESCRIPTION

As summarised above, the present invention is based, in part, on the finding that a granule that comprises a polysaccharide absorbent, Mn(II) oxalate, a salt of composition $[HL]^+(X^{i-})_{1/i}$, $[H_2L]^{2+}(X^{i-})_{2/i}$, $[H_3L]^{3+}(X^{i-})_{3/i}$, $[(HL\text{-}BG\text{-}LH)]^{2+}(X^{i-})_{2/i}$, $[(HL\text{-}BG\text{-}LH_2)]^{3+}(X^{i-})_{3/i}$, $[(H_2L\text{-}BG\text{-}LH_2)]^{4+}(X^{i-})_{4/i}$, $[(H_3L\text{-}BG\text{-}LH_2)]^{5+}(X^{i-})_{5/i}$, and/or $[(H_3L\text{-}BG\text{-}LH_3)]^{6+}(X^{i-})_{6/i}$, wherein L, BG, i and X are as hereto before described, preferably L being a compound of formula (I) or L-BG-L being two compounds of formula (I) linked via a BG group described herein, and a water-soluble polymer as coating material can be obtained. Said granule exhibits high stability in detergent formulations upon storage.

The term "water-soluble" when used in this description is meant to describe a compound which is soluble in water of 20° C. at a concentration of at least 30 g/L.

The granule of the first aspect of the invention comprises a polysaccharide absorbent, Mn(II) oxalate, a salt of a monocyclic triamine compound L or of a compound L-BG-L, preferably of formula (I) or two compounds of formula (I) linked via a BG-group, optionally a processing additive, and in which said granule comprises a coating agent or is preferably coated by a water-soluble coating.

The polysaccharide absorbent serves as a processing additive and facilitates the formation of granules or absorption of any water that is employed during the mixing of the ingredients to make the granules.

The water-soluble polymer as coating material aids to keep the integrity of the granules or of ingredients of said granules during the storage in detergent formulations.

In Mn(II) oxalate, the oxalate is present as a dianion, i.e. both protons of oxalic acid are not present when bound to the manganese ion. In other words, oxalate is present as its dianion, which can also be written as $C_2H_4O_2^{2-}$.

Typically, Mn(II) oxalate exists as Mn(II) oxalate dihydrate or Mn(II) oxalate trihydrate, whereby Mn(II) oxalate dihydrate is more typical.

In an embodiment, the granule comprises between 0.02 and 25 wt-% of Mn(II) oxalate. Suitably, said granule contains between 0.1 and 10 wt-% of Mn(II) oxalate. More suitably, these granules contain between 0.2 and 8 wt-% of Mn(II) oxalate.

The cyclic triamine compound L or L-BG-L is protonated when present in the granules of the first or second aspect of the invention. One of the nitrogen atoms of each polyamine ring can be protonated, i.e. the compound L is in that case monoprotonated. Alternatively, two of nitrogen atoms of each triamine ring can be protonated, i.e. the compound L is then diprotonated. Yet, alternatively, each of the nitrogen atoms can be protonated, i.e. the ligand is in that case triprotonated. The first pKa of 1,4,7-trimethyl-1,4,7-triazacyclononane is 11.7, the second one is 5.1, and the third one is 0.4 (P. Chauduri, K. Wieghardt, Prog. Inorg. Chem., 35, 329-436 (1987)). The granules that comprise the salts are generally between slightly acidic (like pH 4) and neutral, indicating that mainly the monoprotonated and diprotonated salts will be prevalent in said granules.

The unprotonated compounds L and L-BG-L are very strong bases and would be instable in the granules of the first aspect of the invention; being a strong base, will be readily protonated to form the monoprotonated salt in the granules.

The triprotonated salt is a very strong acid and would release its third proton readily. Therefore, the triprotonated salt will likely exist only in a small portion if at all in said granules.

The monoprotonated, diprotonated, or triprotonated triamine ring of the compound of formula L or triamine rings of L-BG-L will have one or more counterions $X^{i-}$ in order to balance the charge of the monoprotonated or deprotonated compound L or L-BG-L and can be conveniently denoted as $[HL]^+(X^{i-})_{1/i}$, $[H_2L]^{2+}(X^{i-})_{2/i}$, $[H_3L]^{3+}(X^{i-})_{3/i}$, $[(HL\text{-}BG\text{-}LH)]^{2+}(X^{i-})_{2/i}$, $[(HL\text{-}BG\text{-}LH_2)]^{3+}(X^{i-})_{3/i}$, $[(H_2L\text{-}BG\text{-}LH_2)]^{4+}(X^{i-})_{4/i}$, $[(H_3L\text{-}BG\text{-}LH_2)]^{5+}(X^{i-})_{5/i}$, and/or $[(H_3L\text{-}BG\text{-}LH_3)]^{6+}(X^{i-})_{6/i}$. Together they will be called the salt of the compound L or compound L salt, or alternatively the salt of the compound L-BG-L or compound L-BG-L salt Typically, the cyclic triamine ligand will be monoprotonated or diprotonated, i.e. $[HL]^+$, $[H_2L]^{2+}$, $[H_3L]^{3+}$, $[(HL\text{-}BG\text{-}LH)]^{2+}$, $[(HL\text{-}BG\text{-}LH_2)]^{3+}$, or $[(H_2L\text{-}BG\text{-}LH_2)]^{4+}$. More typically, the cyclic triamine ligand will be either $[HL]^+$ or $[H_2L]^{2+}$. Even more typically, the cyclic triamine ligand will be $[H_2L]^{2+}$.

The identity of the counteranion(s) $X^{i-}$ is not an essential feature of the invention. However, these will typically be selected from $Cl^-$, $Br^-$, $I^-$, $NO_3^-$, $ClO_4^-$, $PF_6^-$, $BF_4^-$, $OCN^-$, $SCN^-$, $SO_4^{2-}$, $R'SO_4^-$, $R'COO^-$, R"oxalate$^-$, oxalate$^{2-}$, $CF_3SO_3^-$ and $R'SO_3^-$, whereby R' is selected from hydrogen, $C_1$-$C_8$ alkyl and optionally methyl substituted phenyl, whereby R" is selected from H, Na, K and Li. R"oxalate$^-$ is a mono-charged counterion, whereby R" can be hydrogen, i.e. HOOC—COO$^-$ (hydrogen oxalate), or an alkali metal ion selected from $Li^+$, $Na^+$ and $K^+$. In case R"oxalate$^-$ is present, there will be equal number of mono-anionic R"oxalate-groups present in the ligand salt, depending on the number of protons bound to the triamine ring(s) of L or L-BG-L (like for any mono-charged $X^{i-}$ group). Thus $[HL]^+$ will have one mono-anionic R"oxalate$^-$ group as counterion, $[H_2L]^{2+}$or $[(HL-BG-LH)]^{2+}$ will have two mono-anionic R"oxalate$^-$ groups as counterion, $[H_3L]^{3+}$ or $[(HL-BG-LH_2)]^{3+}$ will have three mono-anionic R"oxalate$^-$ groups as counterion, $[(H_2L-BG-LH_2)]^{4+}$ will have four mono-anionic R"oxalate$^-$ groups as counterion, $[(H_3L-BG-LH_2)]^{5+}$ will have five mono-anionic R"oxalate$^-$ groups as counterion, and $[(H_3L-BG-LH_3)]^{6+}$ will have six mono-anionic R"oxalate$^-$ groups as counterion.

Oxalate may also be present as its dianion, which is $(COO)_2^{2-}$. There will be then two monoprotonated L compounds ($[HL]^+$) with each a charge of 1+ per oxalate$^{2-}$ dianion or in case $[H_2L]^{2+}$ or $[(HL-BG-LH)]^{2+}$ is present there will be one di-anionic oxalate$^{2-}$ group as counterion, $[(HL-BG-LH_2)]^{3+}$ will have 1.5 oxalate$^{2-}$ groups as counterion (or 3 oxalate$^{2-}$ groups per 2 $[(HL-BG-LH_2)]^{3+}$ groups). $[(H_2L-BG-LH_2)]^{4+}$ will have then two oxalate$^{2-}$ groups as counterion. $[(H_3L-BG-LH_2)]^{5+}$ will have 2.5 oxalate$^{2-}$ groups as counterion (or 5 oxalate$^{2-}$ groups per 2 $[(H_3L-BG-LH_2)]^{5+}$ groups). $[(H_3L-BG-LH_3)]^{6+}$ will have 3 oxalate$^{2-}$ groups as counterion.

The dianionic oxalate is denoted as oxalate$^{2-}$ when present as counterion of the compound L salt, or the compound L-BG-L salt.

Hydrogen oxalate is the most typical oxalate salt used as counterion for the compound L or L-BG-L salts.

Similarly, the sulfate di-anion is denoted as $SO_4^{2-}$, for the same reasons as outlined for oxalate di-anion as outlined above. Often, the counterion will be selected from $Cl^-$, $NO_3^-$, hydrogen oxalate, $HSO_4^-$, $R'COO^-$ and $R'SO_3^-$, whereby R' is selected from alkyl and aryl, preferably from methyl, phenyl and 4-methylphenyl.

More often, the counterions will be selected from the group consisting of $Cl^-$, hydrogen oxalate, $HSO_4^-$, acetate, and toluene sulfonate.

Particularly often, the counterions will be selected from the group consisting of $HSO_4$, $Cl^-$ and hydrogen oxalate.

According to particular embodiments, each R of the ring of formula (I) is independently selected from the group consisting of hydrogen, $C_1$-$C_{24}$alkyl, $CH_2CH_2OH$ and $CH_2COOH$; or one R is linked to the nitrogen atom of another Q of another ring of formula (I) via an ethylene or a propylene bridge.

According to other embodiments, each R is independently selected from the group consisting of hydrogen, $C_1$-$C_6$-alkyl, $CH_2CH_2OH$ and $CH_2COOH$; or one R is linked to the nitrogen atom of another Q of another ring of formula (I) via an ethylene or a propylene bridge. According to other embodiments, R is independently selected from the group consisting of $C_1$-$C_{24}$alkyl, $CH_2CH_2OH$ and $CH_2COOH$; or one R is linked to the nitrogen atom of another Q of another ring of formula (I) via an ethylene or a propylene bridge. According to other embodiments, each R is independently selected from $CH_3$, $C_2H_5$, $CH_2CH_2OH$ and $CH_2COOH$. According to other embodiments, each R is independently selected from the group consisting of $C_1$-$C_6$-alkyl, in particular methyl; or one R is linked to the nitrogen atom of another Q of another ring of formula (I) via an ethylene or a propylene bridge. Where one R is linked to the nitrogen atom of another Q of another ring of formula (I), this is typically via an ethylene bridge. In such embodiments, the other R groups, including those in the other ring of formula (I), are the same, typically $C_1$-$C_6$-alkyl, in particular methyl. According to further particular embodiments, including each of those particular embodiments described in the immediately preceding paragraph, $R_1$, $R_2$, $R_3$, and $R_4$ are independently selected from hydrogen and methyl, in particular embodiments in which each of $R_1$, $R_2$, $R_3$, and $R_4$ is hydrogen.

When a compound of formula (I) comprises one group R linked to the nitrogen atom (i.e. N) of another Q of another ring of formula (I) via a bridge, it will be understood that such compounds of formula L-BG-L in particular embodiments comprising an ethylene bridge may alternatively be represented by the following structure:

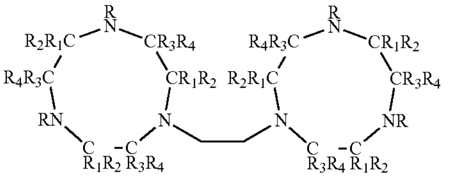

wherein R, $R_1$, $R_2$, $R_3$, and $R_4$ are as herein defined, including the various specific embodiments set out.

Bridge BG is preferably a $C_2$-$C_6$ alkylene bridge, preferably linking two monocyclic polyamines of formula (I). Such alkylene bridges are typically although not necessarily straight chain alkylene bridges as discussed below. They may, however, be cyclic alkylene groups (e.g. the bridge may be cyclohexylene). Where the bridge is a $C_6$-$C_{10}$ arylene bridge, this may be, for example, phenylene or the corresponding arylene formed by abstraction of two hydrogen atoms from naphthalene. Where the bridge comprises one or two $C_1$-$C_3$ alkylene units and one $C_6$-$C_{10}$ arylene unit, such bridges may be, for example, $—CH_2C_6H_4CH_2—$ or $—CH_2C_6H_4—$. It will be understood that each of these bridges may be optionally substituted one or more times, for example once, with independently selected $C_1$-$C_{24}$ alkyl (e.g. $C_1$-$C_{18}$ alkyl) groups.

In the compounds L-BG-L, preferably in those with L being a triamine of formula (I), the bridge is typically a $C_2$-$C_6$ alkylene bridge. Where this is so, the bridge is typically a straight chain alkylene, e.g. is ethylene, n-propylene, n-butylene, n-pentylene or n-hexylene. According to particular embodiments, the $C_2$-$C_6$ alkylene bridge is ethylene or n-propylene. According to still more particular embodiments, the $C_2$-$C_6$ alkylene bridge is ethylene. Herein, references to propylene are intended to refer to n-propylene (i.e. $—CH_2CH_2CH_2—$, rather than $—CH(CH_3)CH_2—$) unless the context expressly indicates to the contrary.

Examples of preferred compounds L are 1,4,7-triazacyclononanes, 1,4,7-triazacyclododecanes, 1,4,8-triazacyclododecanes, 1,4,7-trimethyl-1,4,7-triazacyclononanes and 1,4,7-trimethyl-1,4,7-triazacyclododecanes. At the nitrogen atom and/or at the CH-group these compounds can carry further substituents.

Preferred are the following cyclic polyamines: 1,4,7-triazacyclononane (TACN), 1,4,7-trimethyl-1,4,7-triazacyclononane (1,4,7-$Me_3$TACN), 2-methyl-1,4,7-triaza-cyclononane (2-MeTACN), 1,4-dimethyl-1,4,7-triazacyclononane, 1,2,4,7-tetra-methyl-1,4,7-triazacyclononane (1,2,4,7-$Me_4$TACN), 1,2,2,4,7-pentamethyl-1,4,7-triazacyclononane (1,2,2,4,7-$Me_5$TACN), 2-benzyl-1,4,7-trimethyl-1,4,7-triazacyclononane, and 2-decyl-1,4,7-trimethyl-1,4,7-triazacyclononane.

These cyclic triamines can be synthesized in a manner as described, for example, by K. Wieghardt et al. in Inorganic Chemistry 1982, 21, 3086 ff. or in "Macrocyclic Chemistry" of Dietrich, Viout, Lehn, Weinheim 1993.

These cyclic triamines can be transformed into protonated salts by reaction with the corresponding acids.

According to particular embodiments of the invention, the compound L of formula (I) is 1,4,7-trimethyl-1,4,7-triazacyclononane ($Me_3$-TACN) or the compound L-BG-L is 1,2-bis(4,7-dimethyl-1,4,7-triazacyclonon-1-yl)-ethane ($Me_4$-DTNE). According to still more particular embodiments of the invention, the compound of formula (I) is $Me_3$-TACN.

In an embodiment, the granules comprise a polysaccharide absorbent and between 0.02 and 25 wt-% of the salt with composition $[[HL]^+(X^{i-})_{1/i}$, $[H_2L]^{2+}(X^{i-})_{2/i}$, $[H_3L]^{3+}(X^{i-})_{3/i}$, $[(HL\text{-}BG\text{-}LH)]^{2+}(X^{i-})_{2/i}$, $[(HL\text{-}BG\text{-}LH_2)]^{3+}(X^{i-})_{3/i}$, $[(H_2L\text{-}BG\text{-}LH_2)]^{4+}(X^{i-})_{4/i}$, $[(H_3L\text{-}BG\text{-}LH_2)]^{5+}(X^{i-})_{5/i}$, and/or $[(H_3L\text{-}BG\text{-}LH_3)]^{6+}(X^{i-})_{6/i}$, wherein L, BG, i and $X^{i-}$ are defined above, preferably of the salt of the ligand L or L-BG-L, wherein L is a compound according to formula (I). More preferred the granules comprise between 0.1 and 10 wt-% of the salt of the ligand L or L-BG-L, preferably of the compound L or L-BG-L, wherein L is a compound according to formula (I). Still more preferred, the granules comprise between 0.3 and 6.0 wt-% of the salt of the compound L or L-BG-L, preferably of the compound L or L-BG-L, wherein L is a compound according to formula (I).

Without being bound to theory, the manganese ions that are liberated upon dissolving Mn(II) oxalate in water bind to the cyclic triamine (L) salt. If a triprotonated ligand salt is used, the triprotonated ligand salt will lose two protons upon dissolution in mildly alkaline bleaching solutions, to form the monoprotonated compound species. If a diprotonated ligand salt is used, the diprotonated ligand salt will lose one proton upon dissolution in mildly alkaline bleaching solutions, to form the monoprotonated compound species. In case the L-BG-L salt is used, whereby each L group, or one of its L groups, is diprotonated, each L group will lose one proton upon dissolution in mildly alkaline solutions. In case the L-BG-L salt is used, whereby each L group, or one of its L groups, is triprotonated, each L group or of the L groups will lose two protons upon dissolution in mildly alkaline solutions. The monoprotonated compound ($[HL]^+$ or $[HL\text{-}BG\text{-}LH]^{2+}$) will lose its last proton (per polyamine ring) when binding to Mn(II) ions. The Mn-ligand species thus formed will react further with the alkaline hydrogen peroxide solution to form bleach-active Mn-ligand catalyst species.

In an embodiment, the invention provides granules comprising a polysaccharide absorbent and between 0.02 and 25 wt-% of the salt of compound L with composition $[HL]^+(X^{i-})_{1/i}$, $[H_2L]^{2+}(X^{i-})_{2/i}$, $H_3L]^{3+}(X^{i-})_{3/i}$, $[(HL\text{-}BG\text{-}LH)]^{2+}(X^{i-})_{2/i}$, $[(HL\text{-}BG\text{-}LH_2)]^{3+}(X^{i-})_{3/i}$, $[(H_2L\text{-}BG\text{-}LH_2)]^{4+}(X^{i-})_{4/i}$, $[(H_3L\text{-}BG\text{-}LH_2)]^{5+}(X^{i-})_{5/i}$, and/or $[(H_3L\text{-}BG\text{-}LH_3)]^{6+}(X^{i-})_{6/i}$, wherein L, BG, i and $X^{i-}$ are defined above, and wherein said granules do not comprise Mn(II) oxalate, or any other Mn salt at a level more than 0.01 wt-% (based on Mn).

Preferred less than 0.005 wt % Mn is present, more preferred less than 0.002 wt %, even more preferred less than 0.001 wt % Mn, yet even more preferred less than 0.0003 wt % Mn and most preferred less than 0.0001 wt-% Mn is present in said granules.

More preferred, said granules comprise between 0.1 and 10 wt-% of the salt of the compound L or L-BG-L, preferably of a compound L or L-BG-L, wherein L is a compound according to formula (I). Still more preferred, said granules comprise between 0.3 and 6.0 wt-% of the salt of the compound L or L-BG-L, preferably of the compound L or L-BG-L, wherein L is a compound according to formula (I).

The granules of this embodiment could be of similar composition as the granules that comprise also Mn(II) oxalate (according to first aspect of the invention), as disclosed above. However, it may not be necessary to include a coating material, which is essential to prevent undesired degradation of the Mn(II) oxalate according to the first aspect of the invention, but which is not necessarily present in the granules according the second aspect of the invention.

When no Mn(II) oxalate, or any other Mn salt or Mn complex, is present in the granules at a level greater than 0.01 wt-%, according to the second aspect of the invention, the diprotonated ligand ($[H_2L]^{2+}$), or its analogous L-BG-L salt, ($[H_2L\text{-}BG\text{-}LH]^{3+}$ or ($[H_2L\text{-}BG\text{-}LH_2]^{4+}$, if present in the granules, will upon dissolution in the alkaline wash solution be readily converted to the mononprotonated ligand cation in solution ($[HL]^+$, or its analogous L-BG-L salt, ($[HL\text{-}BG\text{-}LH]^{2+}$) and will remain monoprotonated unless it binds to a metal ion present in the stains, as disclosed by G. Reinhardt, et al., in H&PC Today, vol 9, July-August 2014, pages 54-57. Similarly, when triprotonated cyclic triamine ligands are present in the formulation (i.e. $[H_3L]^{3+}$), or its analogous L-BG-L salt, ($[H_3L\text{-}BG\text{-}LH_2]^{5+}$ or ($[H_3L\text{-}BG\text{-}LH_3]^{6+}$, the triprotonated cyclic triamine ligands lose two protons when dissolved in a mildly alkaline solution or it will lose all its protons when bound to a metal ion.

In an embodiment, the invention provides novel and highly active salts of the formula $[H_2L]^{2+}(Y^{i-})_{2/i}$ $[H_3L]^{3+}(X^{i-})_{3/i}$, L-BG-L, i.e. $[(HL\text{-}BG\text{-}LH)]^{2+}(X^{i-})_{2/i}$, $[(HL\text{-}BG\text{-}LH_2)]^{3+}(X^{i-})_{3/i}$, $[(H_2L\text{-}BG\text{-}LH_2)]^{4+}(X^{i-})_{4/i}$, $[(H_3L\text{-}BG\text{-}LH_2)]^{5+}(X^{i-})_{5/i}$, or $[(H_3L\text{-}BG\text{-}LH_3)]^{6+}(X^{i-})_{6/i}$, whereby i, $X^{i-}$, L and L-BG-L are as herein before defined, preferably L or L-BG-L being a compound wherein L is of formula (I), and $Y^{i-}$ is selected from $Br^-$, $I^-$, $NO_3^-$, $ClO_4^-$, $PF_6^-$, $BF_4^-$, $OCN^-$, $SCN^-$, $SO_4^{2-}$, $R'SO_4^-$, $R'COO^-$, R"oxalate$^-$, oxalate$^{2-}$, $CF_3SO_3^-$ and $R'SO_3^-$, and $X^{i-}$ is selected from $Cl^-$, $Br^-$, $I^-$, $NO_3^-$, $ClO_4^-$, $PF_6^-$, $BF_4^-$, $OCN^-$, $SCN^-$, $SO_4^{2-}$, $R'SO_4^-$, $R'COO^-$, R"oxalate$^-$, oxalate$^{2-}$, $CF_3SO_3^-$ and $R'SO_3^-$, whereby R' is selected from hydrogen, $C_1$-$C_8$ alkyl and optionally methyl substituted phenyl, and whereby R" is selected from H, Na, K and Li. Typically, L is 1,4,7-tri-$C_1$-$C_{24}$-alkyl-1,4,7-triazacyclonane and more typically, L is 1,4,7-trimethyl-1,4,7-triazacyclonane. Typically, L-BG-L is 1,2-bis(4,7-dimethyl-1,4,7-triazacyclonon-1-yl)-ethane ($Me_4$-DTNE).

Typically, the salt, $Y^{i-}$, is selected from $NO_3^-$, $HSO_4^-$, hydrogen oxalate, $R'COO^-$, and $R'SO_3^-$, whereby R' is selected from methyl, phenyl and 4-methylphenyl. More typically $Y^{i-}$ is selected from $HSO_4^-$, acetate, hydrogen oxalate, and toluene sulfonate and most typically $Y^{i-}$ is selected from hydrogen oxalate and $HSO_4^-$.

Typically, the salt, $X^-$, is selected from $Cl^-$, $NO_3^-$, $HSO_4^-$, $R'COO^-$, $R'SO_3^-$, and R"oxalate$^-$, whereby R' is selected from methyl, phenyl and 4-methylphenyl and whereby R" is selected from H, Na, K and Li. More typically $X^-$ is selected from $Cl^-$, $HSO_4^-$, acetate, hydrogen oxalate, and toluene sulfonate and most typically $X^-$ is selected from chloride, hydrogen oxalate and $HSO_4^-$.

The coating agent, present in the granules of the first aspect of the invention and optionally present in the granules of the second aspect of the invention, comprises a water-soluble polymer, preferably polyvinyl alcohol or derivatives of polyvinyl alcohol. Coating agents may also comprise materials such as starches, alginates, cellulose derivatives, fatty acids, waxes, paraffins, polyethylene glycols, gelating compounds, electrolytes, polyelectrolytes.

The coating material used in the granules of this invention may form a coating enveloping one or more of ingredients of the granules and/or may form a coating enveloping the granules. Preferably the granules of the invention are covered with a protective layer or coating. In another preferred embodiment the Mn(II) oxalate is covered with a coating.

In another preferred embodiment the granules of the invention contain a protective layer or coating, more preferred a coating comprising polyvinyl alcohol.

The coating material improves storage stability even in tableted formulations.

The proportion of the coating material in the total granule of the invention is preferably 25 wt.-% or less, especially less than 10 wt.-%, more preferred 0.3 to 10 wt.-%', particularly preferred 0.5 to 7 wt.-% and most preferred 1 to 4 wt.-%.

Typical polyvinyl alcohols used for the formation of the coating or as a binder have a numerical mean of molecular weight in the range from 10,000 to 200,000 (measured at 20° C. using the method of Gel permeation chromatography (GPC)) (corresponding to the viscosity of a 4 wt-% aqueous solution at 20° C. from approx. 2 to 70 mPa*s; measured with the ball drop viscosimeter according to Höppler, DIN 53015) and more typically between 20,000 and 100,000.

Polyvinyl alcohol is generally produced by saponification of polyvinyl acetate.

Particularly suitable polyvinyl alcohol has a hydrolysis degree of 70 to 100 mol %, more preferred between 80 and 99 mol %, and its aqueous solution has a viscosity according to Höppler at 20° C. from 2 to 70 mPa*s. A variety of PVOH polymers having different degrees of polymerisation and hydrolysis are available under the trade name Poval® of Kuraray Chemicals.

Other suitable polyvinyl alcohols may be modified in any kind of hydrophobic or hydrophilic.

Examples of hydrophobic modified polyvinyl alcohols containing in their main chain water-insoluble monomer building blocks are ethylene-containing polyvinyl alcohols of type Exceval® of Kuraray.

Another option is to modify the polyvinyl alcohol by grafting reactions to the alcohol groups, such as the partial acetalisation of the alcohol groups of the polyvinyl alcohol, wherein the polyvinyl alcohols are equipped with any residues which can be either hydrophobic or hydrophilic, such as for example, Mowiflex polyvinyl alcohols from Kuraray. Also the vinyl alcohol groups may be partly modified by reaction with aldehydes, especially $C_2$-$C_{10}$ aldehydes as exemplified in WO2018/011596 (Itaconix Ltd.).

The modified residues can be block-like or statistically arranged.

Preferably used polyvinyl alcohols and acetalized polyvinyl alcohols have molecular weights in the range of 10,000 to 200,000 g/mol, preferably of 11,000 up to 90,000 g/mol, particularly preferred from 12,000 to 80,000 g/mol and in particular preferred from 13,000 to 70,000.

In the preparation of the coating mixtures of different polyvinyl alcohols or mixtures of polyvinyl alcohols with other organic polymers or low molecular weight compounds may be used. Preferably, the coating comprises to a vast majority a polyvinyl alcohol or mixtures thereof, for example at least 80 wt.-% of polyvinyl alcohol or mixtures thereof, based on the total weight of the coating.

The granules according to the invention contain at least one polysaccharide absorbent which is present in amounts between 2 and 95 wt-%, preferably between 5 and 60 wt-% and most preferred between 10 and 50 wt-%, wherein the percentages refer to the total amount of the granule.

In one embodiment the granule according to the invention contains at least one of the additional ingredients selected from the group consisting of a water-soluble polymer; a filler; a salt; and a bleach activator; and wherein these ingredients are present in the following amounts 0-20 wt-% of a water-soluble polymer 0-85 wt-% of a filler;

0-85 wt-% of an inorganic salt;

0-90 wt-% of a bleach activator; wherein the percentages refer to the total amount of the granule.

The polysaccharide absorbent processing additive that is included in the granule according to the first or second aspect of the invention helps to obtain suitable processing features, including absorbance and/or removal of water that may be present during the processing step to make the granules or the water that is present in the detergent formulation during the period of storing the detergent formulation. It also aids in binding together the components of the granules. Suitable processing additives are based on polysaccharides, which includes starch, modified starch, glycogen, natural gum, such as alginate or a combination thereof.

Natural gums are polysaccharides of natural origin which are capable of causing a large increase in solution viscosity. They are mostly botanical gums, found in the woody elements of plants or in seed coatings. Examples of natural gums are natural gums obtained from seaweeds, e.g. agar, alginic acid, sodium alginate and Carrageenan, or natural gums obtained from non-marine botanical resources, e.g. gum arabic, gum ghatti, gum tragacanth, Karaya gum, guar gum, Locust bean gum, beta-glucan, dammar gum, glucomannan, *Psyllium* seed husks and Tara gum, or natural gums produced by bacterial fermentation, e.g. gellan gum or xanthan gum.

Most suitable as processing additive is a starch, which is a polymer of glucose in which the glucopyranose units are bonded by α-linkages. Suitable sources of starch are potato starch, maize starch, rice starch, wheat starch and partially pregellatinised starches from the aforementioned list. Alternatively, the processing additive may be a modified starch, such as dextrin, a gum or alginate. Most suitably, the processing additive is maize starch, potato starch or rice starch. Also particularly suitable are cellulosic materials, such as cellulose fibers, methyl cellulose, hydroxyethyl cellulose, hydroxypropyl cellulose, or carboxy-modified celluloses, such as carboxylmethyl cellulose (CMC). Most suitable is cellulose, in particularly microcrystalline cellulose (e.g. Heweten 101).

In an embodiment, the granules comprise between 5 and 95 wt-% of the processing additive. In another embodiment said granules comprise between 10 and 60 wt-% of the processing additive. In yet another embodiment said granules comprise between 15 and 50 wt-% of the processing additive. In an embodiment, the processing additive is added as a solid material having a purity typical of more than 90 wt-% and more typical of more than 95 wt-% The water-soluble polymer that may be included in the granules encompassing the monoprotonated, diprotonated or triprotonated cyclic triamine ligand salt according to the first or second aspect of the invention, includes poly(vinylpyrrolidones), polyalkylene glycols, functionalised poly(vinylalcohol)s and polyacrylates. The water-soluble polymer may be present in the coating and/or in the bulk of the granule. Examples of preferred polyvinyl alcohols or of modified polyvinyl alcohols are given above when disclosing preferred embodiments of the coating. These preferred (modified) polyvinyl alcohols can also be used in the bulk of the granule.

In an embodiment, the granules comprise between 0.1 and 20 wt-% of the water-soluble polymer. Suitably, said granules comprise between 0.3 and 15 wt-% of the water-soluble polymer. More suitably, said granules comprise between 0.5 and 10 wt-% of the water-soluble polymer. Even more suitably, said granules comprise between 1.0 and 8.0 wt-% of the water-soluble polymer.

In an embodiment the water-soluble polymer is added as an aqueous solution to a mixture of the processing additive and Mn(II) oxalate. Alternatively, in another embodiment, the water-soluble polymer is added as an aqueous solution to the processing additive, after which this mixture is added to the other components of the granules. The concentration of the water-soluble polymer is between 5 and 50 wt-% in water, more typically between 10 and 30 wt-%. Most typically higher concentrations of the polymer dissolved in water will be preferred.

In an embodiment, the granules of the first and second aspect of the invention comprise a filler, which may be either an organic filler or an inorganic filler, or a mixture thereof. Suitable organic fillers differ from the aforementioned polysaccharide absorbent processing additive and include saccharides and derivatives thereof, including sugars. Examples of sugars include glucose, dextrose, fructose, galactose, sucrose, lactose, maltose. Also modified saccharides may be used.

In another embodiment the filler is an inorganic filler. Inorganic fillers include talcs, micas, zeolites, silicates, silicas and clays. Suitably, the inorganic filler is selected from talcs, micas, zeolites, and silicates.

In another embodiment the granules comprise a cellulosic compound, optionally in combination with an inorganic filler such as described above.

In an embodiment the granules comprise between 0 and 85 wt-% of a filler. In another embodiment said granules comprise between 0 and 60 wt-% of a filler. In another embodiment said granules comprise between 0 and 40 wt-% of a filler. In yet another embodiment said granules comprise between 0 and 20 wt-% of a filler. In another embodiment said granules do not comprise any filler.

In an embodiment, the granules of the first and second aspect of the invention comprise a salt, which may be typically alkali metal, alkali earth metal, or transition-metal salts of bicarbonates, carbonates, halides (chloride, bromide or iodide), sulfates, phosphates, oxides, acetates, citrates or nitrates.

In an embodiment the granules comprise one or more salts selected from the group consisting of sodium bicarbonate, sodium sulfate, sodium chloride, sodium nitrate, sodium acetate, sodium citrate, sodium nitrate, potassium sulfate, potassium chloride, potassium citrate, calcium carbonate, calcium chloride and calcium sulfate. Suitably, the compositions comprise one or more salts selected from the group consisting of sodium sulfate, calcium carbonate and sodium citrate.

In an embodiment the salts are typically water soluble.

In an embodiment the granules comprise between 0 and 85 wt-% of a salt. In another embodiment the said granules comprise between 0 and 60 wt-% of a salt. In another embodiment said granules comprise between 0 and 40 wt-% of a salt. In yet another embodiment said granules comprise between 0 and 20 wt-% of a salt. In another embodiment said granules do not comprise any salt.

The granules may also comprise of a bleach activator. As bleach activators, the granules of the invention can contain compounds generally known from the prior art. These are preferably multiple acylated alkylene diamines, in particular tetraacetylethylene diamine (TAED), acylated triazine derivatives, in particular 1.5-diacetyl-2, 4-dioxohexahydro-1,3,5-triazine (DADHT), acylated glycolurils, in particular tetraacetylglycoluril (TAGU), glyceroltriacetate (triacetin), N-acylimides, in particular N-nonanoyl succinimide (NOSI), acylated phenolic sulfonates, in particular n-nonanoyloxi- or n-lauroyloxibenzenesulfonate (NOBS or LOBS), acylated phenolic carboxylic acids, in particular nonanoyloxi- or decanoyloxibenzoic acid (NOBA or DOBA, respectively), carboxylic acid anhydrides, in particular phthalic acid anhydride, acylated multivalent alcohols, preferably triacetine, ethyleneglycol diacetate and 2.5-diacetoxy-2,5-dihydrofurane as well as acetyliertated sorbitol and mannitol or their mixtures, respectively (SORMAN), acylated sugar derivatives, preferably pentaacetylglucose (PAG), pentaacetylfructose, tetraacetylxylose and octaacetyllactose as well as acetylated and optionally N-alkylated glucamine and gluconolactone, and/or N-acylated lactams, for example N-benzoylcaprolactam. Hydrophilic substituted acylacetales and acyllactames can also preferably be used. In addition, nitrile derivatives such as n-methyl-morpholinium acetonitrile-methyl sulfate (MMA) or cyanomorpholine (MOR) can be used as bleaching activators. Combinations of bleaching activators can also be used.

Suitably the granules may comprise TAED, NOBS, triacetin, and DOBA. More suitably the granules may comprise TAED.

In an embodiment, the granules comprise between 0 and 90 wt-% of the bleach activator. Suitably, said granules comprise of 0-75 wt-% of the bleach activator. Also suitable are granules that do not comprise any bleach activator. Also suitable are granules that comprise particles comprising between 20 and 70 wt-% of the bleach activator and more suitably between 30 and 60 wt-% of the bleach activator.

The granules of the invention are preferably available as granular or tablet-shaped preparations which can be prepared in a known manner, for example by mixing, granulating, roll compacting and/or by spray drying of the thermally resilient components and then by adding the more sensitive components, for example enzymes, bleaching agents and the bleach catalyst.

The granules of the invention can be present, for example, as granular or tablet-shaped solids. Preferred are granular shaped solids.

The production of the granules of the invention can be carried out according to methods known per se and has already been described in detail in the above-mentioned patent documents. There are basically different granulation methods available.

In a first preferred process variant, building-up of the granules takes place in a mixing apparatus. The components are processed in usual mixing devices operating batch-by-batch or continuously, which are usually equipped with rotating mixing organs. When mixing, all mixing variants are conceivable, which ensure a sufficient mixing of the components.

In a preferred embodiment, all components are mixed at the same time. However, multi-stage mixing processes are also conceivable, in which the individual components are entered in the overall mixture individually or together with other additives in different combinations.

The order of slow and fast mixers can be exchanged according to requirements. The dwell times in the mixer granulation are preferably 0.5 s to 20 min, especially preferred 2 s to 10 min. The granulation fluid can be pumped into the mixing apparatus via simple conduction tubes. For better distribution, however, nozzle systems (single- or multi-material nozzles) are also conceivable.

Typically, a drying step follows the granulation stage to avoid conglutination of the granules. Then, by sieving the coarse grain parts and the fine grain parts are separated. The coarse grain content is crushed by grinding and, like the fine grain content, is fed to a new granulation process. The application of a coating is preferably provided in a fluidized bed apparatus, for example in a fluidized bed mixer.

Solutions are intensively mixed with powdery active substances and other additives optionally present, resulting in a plastically deformable mass. The mixing step can be performed in the above-mentioned mixing apparatus, but also kneaders or special extruder types are conceivable. The granulation mass is then pressed by means of tools through the nozzle holes of a press matrix, creating cylindrically shaped extrudates. The exiting extrudates must be crushed to the desired length or particle size by a post-processing step. In many cases, a length/diameter ratio of L/D=1 is desired. For cylindrical granules, the particle diameter is typically between 0.2 and 2 mm, preferably between 0.5 and 0.8 mm, the particle length is in the range of 0.5 to 3.5 mm, ideally between 0.9 and 2.5 mm. The length or size adjustment of the granules can be obtained, for example, by fixed stripper knives, rotating cut knives, cut wires or blades. To round off the cutting edges, the granules can then be rounded again in a rondier.

After the size adjustment of the granules, often a final solidification step is required in which the solvent is removed and a coating is applied. This step is usually carried out in a fluidized bed apparatus, which is operated as a dryer. Then, by sieving the coarse grain part and the fine grain part is separated. The coarse grain content is crushed by grinding and, like the fine grain content, is fed to a new granulation process. After that, the generated granules may be equipped with a coating in a fluidized bed apparatus, for example in a fluidized bed mixer.

Preferred granules of the invention are also characterized by a water content of less than 3% by weight (measured by Karl Fischer), based on the total amount of granules, especially preferred 0 to 2% by weight.

For the preparation of the cleaning agents according to the invention in tablet form, preferably all components are combined in a mixer and mixed with each other. Subsequently, the mixture is compacted by means of conventional tablet presses, for example using eccentric presses or rotary presses with pressures in the range between $200\times10^5$ Pa and $1500\times10^5$ Pa.

One thus obtains easily break-resistant tablets which are under application conditions sufficiently quickly soluble and which have flexural strengths of normally more than 150 N. Preferably, a tablet produced in this way has a weight of 15 to 40 g, in particular from 20 to 30 g, with a diameter of 35 to 40 mm.

The preparation of the compositions of the invention in the form of non-dusting, storage-stable and free-flowing granules with high bulk densities in the range of 800 to 1000 g/l can be carried out in that in a first process sub-stage the builder components are mixed with at least a proportion of liquid mixture components by increasing the bulk density of this premixture and subsequently—if desired after an intermediate drying—the further components of the composition, including the bleach catalyst, are combined with the thus obtained premixture.

Appropriate conditions such as durations of and temperatures for the contacting will depend on the nature of the reactants (the salt of the compound L or L-BG-L, optionally Mn(II) oxalate, and other ingredients to obtain suitable granules) and their quantities and can be established without undue burden by the skilled person. For example, durations of contacting may be between about 1 min and about 24 hours. Often, the contacting can be carried out at ambient temperature, for example at about 20 to 25° C. although elevated temperatures, for example between about 25 and about 50° C. may be used if desired.

As will be appreciated by the person skilled in the art, it may be desirable to subject compositions according to the first and second aspect of the invention to further processing, for example to make granules having beneficial properties, to include in the bleaching formulations of the invention, for example solid detergent formulations.

Thus the bleaching formulation of the invention may be in the form of non-friable granules comprising the compositions according to the first or second aspect of the invention, optionally with additional inert solid, bleach precursor, filler and salt, and with a coating agent. Definitions and descriptions of each essential and optional class of ingredients are given in the detailed description section above.

The granules of the first or second aspect of the invention, optionally in the form of non-friable granules as described above, are typically subjected to compaction, grinding, pulverising or the like so as to provide a dried composition having a desired particle size. As is well-known in the art, where such compositions are to be introduced into solid bleaching formulations, such as granules for use in laundry, agglomerated granules comprising bleach-activating catalysts are desirably of approximately the same size and bulk density as the other components of a solid bleaching formulation, so as to avoid segregation by percolation or floating.

The invention also relates to a process for the preparation of a granule of the first aspect of the invention, wherein said process comprises the steps of:

(a) mixing a solution comprising a salt of composition $[HL]^{+}(X^{i-})_{1/i}$, $[H_2L]^{2+}(X^{i-})_{2/i}$, $H_3L]^{3+}(X^{i-})_{3/i}$, $[(HL\text{-}BG\text{-}LH)]^{2+}(X^{i-})_{2/i}$, $[(HL\text{-}BG\text{-}LH_2)]^{3+}(X^{i-})_{3/i}$, $[(H_2L\text{-}BG\text{-}LH_2)]^{4+}(X^{i-})_{4/i}$, $[(H_3L\text{-}BG\text{-}LH_2)]^{5+}(X^{i-})_{5/i}$, and/or $[(H_3L\text{-}BG\text{-}LH_3)]^{6+}(X^{i-})_{6/i}$, whereby L, BG, i and $X^{i-}$ are as defined above, the Mn(II) oxalate, the polysaccharide absorbent processing additive, optionally the filler, optionally the water-soluble polymer, optionally the salt and optionally the bleach activator;
(b) compacting the mixture of step (a); and
(c) coating the compacted material of step (b) by a coating agent.

The invention also relates to a process for the preparation of a granule of the second aspect of the invention, wherein said process comprises the steps of:

(a) mixing a solution comprising a salt of composition $[HL]^{+}(X^{i-})_{1/i}$, $[H_2L]^{2+}(X^{i-})_{2/i}$, $H_3L]^{3+}(X^{i-})_{3/i}$, $[(HL\text{-}BG\text{-}LH)]^{2+}(X^{i-})_{2/i}$, $[(HL\text{-}BG\text{-}LH_2)]^{3+}(X^{i-})_{3/i}$, $[(H_2L\text{-}BG\text{-}LH_2)]^{4+}(X^{i-})_{4/i}$, $[(H_3L\text{-}BG\text{-}LH_2)]^{5+}(X^{i-})_{5/i}$, and/or $[(H_3L\text{-}BG\text{-}LH_3)]^{6+}(X^{i-})_{6/i}$, whereby L, BG, i and $X^{i-}$ are as defined above, the polysaccharide absorbent processing additive, optionally the water-soluble polymer, optionally the filler, optionally the inorganic salt and optionally the bleach activator;

(b) compacting the mixture of step (a); and (c) optionally coating the compacted material of step (b) by a coating agent, whereby the mixture of step (a) contains no or less than 0.01 wt-% of Mn.

In a preferred embodiment of these processes the mixture of step (a) is extruded as an extrudate.

The granules according to the first or second aspect of the invention are typically present in bleaching formulations according to the third aspect in a solid, generally particulate, form (for example as granules), with mean particle sizes typically between 50 and 2500 μm, for example between 100 and 1600 μm. Particle sizes may be measured by a laser diffraction particle size analyser, for example a Malvern HP equipped with a 100 mm lens.

Bulk density and size of the granules can be controlled via the composition, the process condition or both, as is known in the art.

The skilled person is well acquainted with suitable particle sizes and densities (and/or can determine appropriate sizes and densities through routine experimentation), and with suitable techniques to achieve these, for example through conventional granulation techniques. For example, suitable particles may be prepared, according to the third aspect of the invention, by any conventional and/or known granulation techniques, such as using a pan granulator, fluidised bed, Schugi mixer, Lödige ploughshare mixer, rotating drum and other low energy mixers; by compaction, including extrusion and tabletting optionally followed by pulverising and grinding; when melt binding agents are used by prilling and pastilling using a Sandvik Roto Former; and by high shear-energy process using a high-speed mixer/granulator equipment having both a stirring action of high energy and a cutting action. An example of a suitable compactor is equipment from Hosokawa, e.g. Bepex L200/30. Examples of such high-speed mixture/granulator equipment are the Fukae™ FS-G mixture manufactured by Fukae Powtech Kogyo Co, Japan. Other mixers usable in the process of the invention include the Diosna™, ex T. K. Fielder Ltd UK; the Fuji™ VG-C Series ex Fuji Sangyo Co. Japan; and the Roto™ ex Zanchete & Co S.r.l. Italy. Besides batch equipment, it is also possible to use a high-speed mixer/granulator such as the Lödige Recycler.

The granules according to the first aspect of the invention, i.e. those comprising Mn(II) oxalate, polysaccharide absorbent and salts of compound L or L-BG-L described herein, are of particular use when used in bleaching formulations. The granules serve to catalyse the oxidising activity of a peroxy compound, which may either be included within a bleaching formulation according to the present invention, or may be generated from such a bleaching formulation in situ.

The granules according to the second aspect of the invention, i.e. those comprising polysaccharide absorbent, salts of compound L or L-BG-L described herein, but not Mn(II) oxalate, may be used in bleaching formulations without any addition of a source of Mn. In the presence of a peroxy compound, the salt of compound L or L-BG-L is thought to bind to Mn ions present in certain stains as explained above.

Alternatively, the granules according to the second aspect of the invention, may be used in bleaching formulations that comprise separately compositions that comprise Mn salts or Mn complexes. Without being bound to theory, when the granules comprising the salt of compound L or L-BG-L, according to the second aspect of the invention, and those comprising Mn salts or Mn complexes, dissolve in water to get in contact with the substrate, according to the fifth aspect of the invention, in situ formation of Mn-ligand species occurs, thus leading to an enhanced stain bleaching activity.

Various commercially available Mn salts could be employed for this purpose, such as Mn(II) oxalate, $Mn(III)_2(oxalate)_3$, $Mn(II)(acetate)_2$, $Mn(III)(acetate)_3$, $Mn(II)(chloride)_2$, Mn(II)sulfate, $Mn(II)(nitrate)_2$ and $Mn(III)(acetylacetonate)_3$. Of these Mn(II) oxalate, $Mn(II)(acetate)_2$, $Mn(II)(acetate)_2$, $Mn(II)(chloride)_2$, Mn(II)sulfate, $Mn(II)(nitrate)_2$ are typically used. More typically Mn(II) oxalate, $Mn(II)(acetate)_2$, and Mn(II)sulfate are used. Most typically, granules comprising Mn(II) oxalate are employed when separately added to the bleaching formulation that contain granules comprising the salt of compound L or L-BG-L according to the second part of the invention. WO2016/012080 (Weylchem Wiesbaden GmbH) describes the use of Mn(II) oxalate in machine dishwash formulations, including those containing granulates comprising Mn(II) oxalate.

If compositions comprising a Mn complex are applied, said Mn complex may comprise a ligand L or L-BG-L, preferably a ligand L or L-BG-L, wherein L is a compound according to formula (I), or it may comprise a ligand that is not according to ligand L or L-BG-L. For avoidance of any doubt, when L or L-BG-L is bound to a transition-metal ion, each triamine ring that is bound to said metal ion will be fully deprotonated. Definition the latter types of Mn complexes can be found in WO2017/134463 (Catexel Ltd.). A composition comprising a Mn complex that comprises a ligand L or L-BG-L, wherein L is a compound according to formula (I) is more typical. More typical is a composition comprising a dinuclear Mn complex L-BG-L, wherein L is a compound according to formula (I). Even more typical is a composition comprising a Mn complex that comprises 1,4,7-trimethyl-1,4,7-triazacyclononane ($Me_3$-TACN) or 1,2-bis(4,7-dimethyl-1,4,7-triazacyclonon-1-yl)-ethane ($Me_4$-DTNE). More typical is a composition comprising a complex selected from $[Mn^{IV}_2(\mu\text{-}O)_3(Me_3TACN)_2](PF_6)_2$, $[Mn^{IV}_2(\mu\text{-}O)_3(Me_3TACN)_2]Cl_2$, $[Mn^{IV}_2(\mu\text{-}O)_3(Me_3TACN)_2]SO_4$, $[Mn^{IV}_2(\mu\text{-}O)_3(Me_3TACN)_2](NO_3)_2$, $[Mn^{IV}_2(\mu\text{-}O)_3(Me_3TACN)_2](CH_3COO)_2$, $[Mn^{IV}_2(\mu\text{-}O)_3(Me_3TACN)_2](benzoate)_2$, $[Mn^{III}Mn^{IV}(\mu\text{-}O)_2(\text{—}CH_3COO)(Me_4DTNE)](PF_6)_2$, $[Mn^{III}Mn^{IV}(\mu\text{-}O)_2(\mu\text{-}CH_3COO)(Me_4DTNE)]Cl_2$, $[Mn^{III}Mn^{IV}(\mu\text{-}O)_2(\mu\text{-}CH_3COO)(Me_4DTNE)]SO_4$, $[Mn^{III}Mn^{IV}(\mu\text{-}O)_2(\mu\text{-}CH_3COO)(Me_4DTNE)](NO_3)_2$, and $[Mn^{III}Mn^{IV}(\mu\text{-}O)_2(\mu\text{-}CH_3COO)(Me_4DTNE)](CH_3COO)_2$.

Even more typical is a composition that comprises either $[Mn^{III}Mn^{IV}(\mu\text{-}O)_2(\mu\text{-}CH_3COO)(Me_4DTNE)]Cl_2$ or $[Mn^{IV}_2(\mu\text{-}O)_3(Me_3TACN)_2](PF_6)_2$. Most typical is a composition that comprises $[Mn^{IV}_2(\mu\text{-}O)_3(Me_3TACN)_2](PF_6)_2$.

Suitable examples of a granule comprising a dinuclear Mn(IV) complex that comprise a ligand according to formula (I) can be found in WO94/21777 (Unilever PLC and Unilever N.V.), WO95/06710 (Unilever PLC and Unilever N.V.), WO2014/198368 (Weylchem Wiesbaden GmbH), WO2014/198369 (Weylchem Wiesbaden GmbH), WO2016/177439 (Novozymes A/S), WO2017/118542 (Dalli-Werke GmbH), WO2017/153612 (Novozymes A/S and Unilever N.V.), WO2018/011596 (Itaconix Ltd.) and WO2018/210442 (Weylchem Wiesbaden GmbH).

Without being bound to theory, when applying a mixture of a ligand according to compound L or L-BG-L, wherein L is as defined above and preferably is a compound of formula (I), and a Mn complex that comprises a ligand which is different from compound L or L-BG-L in the bleaching solution, the ligand according to compound L or L-BG-L displaces that ligand that was originally bound to the Mn complex, forming MnL or MnL-BG-L species that activate the peroxy compound in the bleaching solution leading to enhanced stain bleaching.

If the ligand L or L-BG-L is protonated, upon binding to the metal ion the ligand L or L-BG-L will lose its protons. Said displacement of the ligand bound to the Mn complex, will not take place if a Mn complex comprising a ligand L or L-BG-L, such as a ligand L or L-BG-L, wherein L is a compound according to formula (I) is used in the granules. However during the bleaching process, some of the ligand may degrade during the bleaching processes and by addition of the granules comprising the ligand according to the second aspect of the invention, the degraded ligand species from the Mn complex may be replaced by the ligand L or L-BG-L, such as the ligand L or L-BG-L, wherein L is a compound of formula (I), leading to re-establishment of the bleaching activity. As a consequence, the amount of Mn complex in the granules used in the detergent product may be reduced significantly as compared to detergent products that do not comprise granules according to the second aspect of the invention. Therefore, the colour of said granules will be less intense than of the analogous granules comprising the Mn complex comprising a ligand L or L-BG-L, such as a ligand L or L-BG-L, wherein L is a compound of formula (I).

Where a peroxy compound is present in a bleaching formulation comprising granules of the invention, this may be, and typically is, a compound which is capable of yielding hydrogen peroxide in aqueous solution. Suitable amounts of peroxy compounds included within the bleaching formulation may be determined by the skilled person although typical quantities will be within the range of 1-35 wt %, for example 5-25 wt %, based on the solids content of the bleaching formulation. One of skill in the art will appreciate that smaller quantities of peroxy compounds may be used where the bleaching formulation comprises a bleaching system (discussed below) comprising a peroxy compound and a so-called bleach precursor.

Suitable hydrogen peroxide sources are well known in the art. Examples include the alkali metal peroxides, organic peroxides such as urea peroxide, and inorganic persalts, such as alkali metal perborates, percarbonates, perphosphates, persilicates, and persulfates. Typical peroxy compounds included within bleaching formulations are persalts, for example optionally hydrated sodium perborate (e.g. sodium perborate monohydrate and sodium perborate tetrahydrate) and sodium percarbonate. According to particular embodiments, the bleaching formulation comprises sodium perborate monohydrate or sodium perborate tetrahydrate. Inclusion of sodium perborate monohydrate is advantageous owing to its high active oxygen content. Use of sodium percarbonate is most advantageous for environmental reasons. Organic peroxy acids may also serve as the peroxy compound. These may be mono- or diperoxyacids. Typical mono- or diperoxyacids are of the general formula HOO—(C═O)—R—Z, wherein R is an alkylene or substituted alkylene group containing from 1 to about 20 carbon atoms, optionally having an internal amide linkage or a phenylene or substituted phenylene group; and Z is hydrogen, halogen, alkyl, aryl, an imido-aromatic or non-aromatic group, a COOH or (C═O)OOH group or a quaternary ammonium group.

Typical monoperoxy acids include peroxy benzoic acids, peroxy lauric acid, N,N-phtaloylaminoperoxy caproic acid (PAP) and 6-octylamino-6-oxo-peroxyhexanoic acid. Typical diperoxy acids include for example: 1,12-diperoxydodecanoic acid (DPDA) and 1,9-diperoxyazeleic acid.

As well as organic peroxyacids, inorganic peroxyacids are also suitable, for example potassium monopersulfate (MPS).

If organic or inorganic peroxyacids are included within bleaching formulations, the amount of them incorporated in a bleaching formulation will typically be within the range of about 2-10 wt %, for example 4-8 wt %.

The bleaching formulation need not comprise a peroxy compound, however: a bleaching formulation of the invention may instead comprise a bleaching system constituted by components suitable for the generation of hydrogen peroxide in situ, but which are not themselves peroxy compounds. An example of this is the use of a combination of a $C_{1-4}$ alcohol oxidase enzyme and a $C_{1-4}$ alcohol, for example a combination of methanol oxidase and ethanol. Such combinations are described in WO 95/07972 A1 (Unilever N.V. and Unilever plc).

Often, a bleaching species is generated in situ. For example, organic peroxyacids are often generated in situ, as opposed to being included within the bleaching formulation, peroxyacids themselves tending to be insufficiently stable. For this reason, bleaching formulations often comprise a bleaching system comprising a persalt (e.g. sodium perborate (optionally hydrated) or sodium percarbonate), which yields hydrogen peroxide in water; and a so-called peroxy bleach precursor capable of reacting with the hydrogen peroxide to generate an organic peroxyacid.

The skilled person is very familiar with the use of bleaching systems comprising peroxy bleach precursors, peroxy bleach precursors being well known to the skilled person and described in the literature. For example, reference in this regard is made to British Patents 836988, 864,798, 907,356, 1,003,310 and 1,519,351; EP 0 185 522 A, EP 0 174 132 A, EP 0 120 591 A; and U.S. Pat. Nos. 1,246,339, 3,332,882, 4,128,494, 4,412,934 and 4,675,393. Suitable bleach precursors have been listed above.

Where used, bleach precursor compounds are typically present in the bleaching formulation in an amount of up to 12 wt %, for example from 2-10 wt %, of the composition, based on the solids content of the bleaching formulation.

Peroxy compounds or bleaching systems as described herein can be stabilised within the bleaching formulation by providing them with a protective coating, for example a coating comprising sodium metaborate and sodium silicate.

For automatic dishwash cleaning, corrosion on glassware during the rinsing stages can be suppressed by using glass corrosion inhibitors. These are, for example, crystalline layered silicates and/or zinc salts. Crystalline layered silicates are available for example from WeylChem under the trade name of SKS-6 ($\delta$-$Na_2Si_2O_5$). Other known crystalline layered silicates are e.g. Na-SKS-1 ($Na_2Si_{22}O_{45}\cdot xH_2O$, kenyaite), Na-SKS-2 ($Na_2Si_{14}O_{29}\cdot xH_2O$, magadiite), Na-SKS-3 ($Na_2Si_8O_{17}\cdot xH_2O$), Na-SKS-4 ($Na_2Si_4O_9\cdot xH_2O$, makatite), Na-SKS-5 ($\alpha$-$Na_2Si_2O_5$), Na-SKS-7 ($\beta$-$Na_2Si_2O_5$, natrosilite), Na-SKS-9 ($NaHSi_2O_5H_2O$), Na-SKS-10 ($NaHSi_2O_5\cdot 3H_2O$, kanemite), Na-SKS-11 (t-$Na_2Si_2O_5$) and Na-SKS-13 ($NaHSi_2O_5$). An overview of crystalline sheet-silicates is found, for example, in the article published in "Seifen-Öle-Fette-Wachse, volume 116, No. 20/1990", on pages 805-808.

In a further preferred embodiment of the invention, the washing and cleaning compositions of the present invention, in particular the dishwasher detergents, incorporate the crystalline layered silicate at preferably 0.1 to 20 wt %, more preferably 0.2 to 15 wt % and more preferably 0.4 to 10 wt %, all relative to the overall weight of the composition.

To control glass corrosion, washing and cleaning compositions of the present invention, in particular dishwasher detergents, may incorporate at least one zinc or bismuth salt, preferably selected from the group of organozinc salts, more preferably selected from the group of soluble organozinc salts, yet more preferably selected from the group of soluble zinc salts of monomeric or polymeric organic acids and yet still more preferably selected from the group consisting of zinc acetate, zinc acetylacetonate, zinc benzoate, zinc formate, zinc lactate, zinc gluconate, zinc oxalate, zinc ricinoleate, zinc abietate, zinc valerate and zinc p-toluenesulfonate. Bismuth salts such as, for example, bismuth acetates are employable as an alternative to or in combination with these zinc salts.

Preference in the context of the present invention is given here to washing and cleaning compositions, in particular dishwasher detergents, where the amount of zinc salt, relative to the overall weight of this composition, is from 0.1 to 10 wt %, preferably from 0.2 to 7 wt % and more preferably from 0.4 to 4 wt %, irrespective of which zinc salts are used, specifically irrespective that is as to whether organic or inorganic zinc salts, soluble or insoluble zinc salts or mixtures thereof are used.

Cleaning agents of the invention may also contain silver corrosion inhibitors for silver corrosion control. Preferred silver corrosion inhibitors are organic sulfides such as cystine and cysteine, di- or trihydric phenols, optionally alkyl- or aryl-substituted triazoles such as benzotriazole, isocyanuric acid, salts and/or complexes of titanium, of zirconium, of hafnium, of cobalt or of cerium wherein the metals referred to are present in one of the oxidation states II, III, IV, V or VI, depending on the metal.

According to particular embodiments, bleaching formulations may be used for bleaching and/or modifying (e.g. degrading) polysaccharides (for example cellulose or starch) or polysaccharide-containing (for example cellulose-containing, also referred to herein as cellulosic) substrates. Cellulosic substrates are found widely in domestic, industrial and institutional laundry, wood-pulp, cotton processing industries and the like. For example, raw cotton (gin output) is dark brown in colour owing to the natural pigment in the plant. The cotton and textile industries recognise a need for bleaching cotton prior to its use in textiles and other areas. The object of bleaching such cotton fibres is to remove natural and adventitious impurities with the concurrent production of substantially whiter material.

Irrespective of the nature of the substrate treated in accordance with the method of the fourth aspect of the invention, it is the objective when doing so to effect bleaching, i.e. to remove unwanted chromophores (be they, for example, stains or solids on cloth in laundering or dishwashing applications; residual lignin in wood pulp or polyphenolic materials present in raw cotton and wood pulp and paper) and/or to degrade material, for example starch or polyphenolic materials in dishwashing. According to particular embodiments, therefore, the substrate may be a dirty dish or a polysaccharide- or polysaccharide-containing substrate, for example wherein the polysaccharide is a cellulosic substrate, such as cotton, wood pulp, paper or starch.

The bleaching formulation of the present invention may thus be used in a method of dishwashing. Such a method typically involves cleaning dishes in a mechanical dishwasher, often to remove starch and polyphenolic components from the dishes' surfaces. The term "dishes" herein embraces within its scope cookware as well as plates, crockery and other eating (e.g., cutlery) and serving tableware, for example items made of ceramic, metallic or plastics materials. Accordingly, embodiments of the fourth aspect of the invention include methods of cleaning dishes in a mechanical dishwasher, which comprise contacting the dishes with water and a bleaching formulation in accordance with the third aspect of the invention.

Although it is to be understood that the invention is not to be considered to be so limited, where a bleaching formulation is intended for use in hard-surface cleaning applications, the bleaching formulation will typically comprise other components well understood by those of normal skill in the art, such as bleach stabilisers (also known as sequestrants), for example organic sequestrants such as aminophosphonate or carboxylate sequestrants; one or more surfactants, for example cationic anionic or non-anionic (amphiphilic) surfactants; as well as other components, including (but not limited to) detergency builders, enzymes and perfuming agents.

A bleaching formulation according to the third aspect of the invention, will contain preferably between 0.1 and 50 wt-% of one or more surfactants. This bleaching formulation may comprise one or more anionic surfactants and one or more non-ionic surfactants. In general the anionic and nonionic surfactants of the surfactant system may be chosen from the surfactants described in "Surfactant Active Agents, Vol 1 by Schwartz & Perry, Interscience 1949, vol 2 by Schwartz, Perry & Berch, Interscience 1958; in the current edition of "McCutcheon's Emulsifiers and Detergents" published by Manufacturing Confectioners Company; or in Tenside Taschenbuch, H. Stache, Carl Hauser Verlag, 1981. Examples of descriptions of suitable anionic and nonionic surfactants can for example be found in WO 03/072690 A1 (Unilever N.V. et al.), WO 02/068574 A1 (Unilever N.V. et al.) and WO 2012/048951 A1 (Unilever PLC et al.)

Those knowledgeable of bleaching formulations will be familiar with the use of enzymes in this context. Enzymes can provide cleaning performance, fabric care and/or sanitation benefits. Said enzymes include oxidoreductases, transferases, hydrolases, lyases, isomerases and ligases. Members of these enzyme classes are described in Enzyme Nomenclature 1992: Recommendations of the Nomenclature Committee of the International Union of Biochemistry and Molecular Biology on the Nomenclature and Classification of Enzymes, 1992, ISBN 0-1202271165-3, Academic Press. Detersive enzymes are described in greater detail in for example U.S. Pat. No. 6,579,839 (Price et al.).

Suitable detergency builders as optional ingredients may also be present, for example as described in WO 00/34427 A1. Builders may include aluminosilicates, in particular zeolites, e.g. zeolite A, B, C, X and Y types, as well as zeolite MAP as described in EP 0 384 070 A; and precipitating builders such as sodium carbonate. Such builders are typically present in an amount from about 5 to about 80 wt-%, more preferably from about 10 to 50 wt-%, based on the solids content of the bleaching formulation.

The skilled person will be readily able to formulate a suitable bleaching formulation for use in dishwash cleaning or laundry cleaning in accordance with his normal skill. Likewise, the skilled person will be readily able to formulate bleaching formulations suitable for use in the other applications described herein. Such formulations may, for example, comprise additional metal-ion based bleach catalysts or organic bleach catalysts suitable for catalysing the activity of the peroxy compounds described herein. Non-limiting examples of transition-metal based bleaching catalysts can be found for example in EP 2 228 429 A1 (Unilever PLC and Unilever N.V.), and references cited therein and examples of organic catalysts can be found in WO 2012/071153 A1 (The Procter & Gamble Company).

The invention also relates to a cleaning method said method comprising contacting a substrate to be cleaned with water and a bleaching formulation as defined hereinto before.

Preferably the cleaning method is a method of cleaning dishes, in particular by using a mechanical dishwasher, the method comprising contacting the dishes to be cleaned with water and the bleaching formulation as defined hereinto before.

Also preferred is a method of cleaning textiles or non-woven fabrics, the method comprising contacting the textiles or the non-woven fabrics to be cleaned with water and the bleaching formulation as defined hereinto before.

The non-limiting examples below more fully illustrate the embodiments of this invention.

EXPERIMENTAL

Chemicals Used

- Mn-oxalate·dihydrate was obtained from Weylchem Performance Products.
- $Mn(II)Cl_2$ tetrahydrate, $Mn(CH_3COO)_2$ tetrahydrate and sodium carbonate were obtained from Sigma Aldrich.
- Corn starch was obtained from Roth.
- TAED (Peractive® P) was obtained from Weylchem Performance Products.
- Polyvinyl alcohol was obtained from Kuraray, under the trade name Poval® 6-88.
- Trisodium citrate was obtained from Jungbunzlauer.
- Sodium percarbonate was obtained from Solvay.
- SKS-6 silicate (Weylclean® SKS-6) was obtained from Weylchem Performance Products.
- PEG 1500 and PEG 6000 powder were obtained from Clariant.
- Sokalan® PA25 $C_1$ and Lutensol were obtained from BASF.
- Protease Blaze Evity 150T and Amylase Stainzyme Plus Evity 24T were obtained from Novozymes.
- All other chemicals were obtained Sigma Aldrich.

Synthesis of Protonated Ligand Salts

General Procedure:

In a 2 liters three necked flask equipped with reflux condenser, temperature control and stirrer 750 ml water is placed together with 200 g of $Me_3TACN$. The amine $Me_3TACN$ solution in water is cooled in an ice bath to about 5-10° C. while stirring. The calculated amount of hydrochloric acid (2 mol equivalent concentrated hydrochloric acid of 37 wt % purity) or sulfuric acid (2 mol equivalent of concentrated sulfuric acid of 96 wt % purity) was carefully added to the amine solution via a dropping funnel and ice cooling. Similarly, 1 mol equivalent of solid oxalic acid (98 wt-%) was added slowly as a solid to the solution containing $Me_3TACN$. In all cases, the temperature inside the flask was kept below 20° C. by using ice cooling. After finalizing the addition of the acid the mixture was stirring for one hour.

The water was removed on a rotary evaporator under vacuum. All of the products formed are yellowish to off white solids.

Recrystallization from ethanol yielded generally white to off-white powders, which were dried in vacuo overnight at 70° C. After separating the solids from the ethanol and then evaporating the ethanol using a rotary evaporator, a dark brownish oil was recovered (which was discarded).

The yields of $[H_2(Me_3TACN)]Cl_2$, $[H_2(Me_3TACN)](HSO_4)_2$ and $[H_2(Me_3TACN)](Hoxalate)_2$ were 92, 89 and 68% respectively (based on amount of $Me_3TACN$).

Analyses

Elemental Analysis $H_2(Me_3TACN)]Cl_2\cdot½\,H_2O$ (Mw=253.21)

Calcd. for $C_9H_{23}N_3Cl_2$: C, 42.69, H, 9.55, N, 16.59; Found: C, 42.49/42.60; H, 9.71/9.73; N, 16.64/16.56.

Chloride content was determined by gravimetric analysis of AgCl, yielding 28.27% Cl (calc 28.06%).

$[H_2(Me_3TACN)](Hoxalate)_2$ (MW=351.35)

Calcd. for $C_{13}H_{25}N_3O_8$: C, 44.44, H, 7.17, N, 11.96. Found: C, 44.29/44.38, H, 7.22/7.29, N, 11.89/11.89.

$[H_2(Me_3TACN)](HSO_4)_2$ (MW=367.43)

Calcd. for $C_9H_{27}N_3S_2O_8$: C, 29.43, H, 6.86, N, 11.44, S, 17.45; Found: C, 29.27/29.27, H, 6.89/6.94, N, 11.34/11.33, S, 17.39/17.21.

Infrared and Raman Spectroscopy $[H_2(Me_3TACN)](Hoxalate)_2$

IR bands at 1612 and 713 $cm^{-1}$ assigned to oxalate vibrations, in agreement with literature (K. I. Peterson and D. P. Pullmann, J. Chem. Ed., 93, 1130, 2016). Raman bands at 1463 and 885 $cm^{-1}$ assigned to oxalate vibrations, in agreement with literature (K. I. Peterson and D. P. Pullmann, J. Chem. Ed., 93, 1130, 2016).

$[H_2(Me_3TACN)](HSO_4)_2$

IR bands at 3400 $cm^{-1}$ assigned to OH stretch of hydrogen sulfate anion and 1700 $cm^{-1}$ assigned to asymmetric vibration of hydrogen sulfate anion. Also peaks at 1074, 1027, 820, 624 $cm^{-1}$ originating from same anion, as listed in literature: A. Periasamy, et al., *Rasayan J. Chem.*, 2, 981 (2009).

Raman peaks at 975 and 624 $cm^{-1}$ assigned to sulfate anion, as published in the same paper.

NMR Spectroscopy $[H_2(Me_3TACN)](HSO_4)_2$ in $D_2O$: 2.89 ppm (3H, $CH_3$) and 3.91 ppm (4H, $CH_2CH_2$).

$[H_2(Me_3TACN)](HSO_4)_2$ in $d^6$-DMSO: 2.72 ppm (3H, $CH_3$) and 3.36 ppm (4H, $CH_2CH_2$), 8.12 ppm, broad (1.2 H, broad—sulfuric acid).

$[H_2(Me_3TACN)](Hoxalate)_2$ in $d^6$-DMSO: 2.51 ppm (3H, $CH_3$), 2.91 ppm (4H, $CH_2CH_2$), and 11.05 ppm (1.4, broad—oxalic acid).

$[H_2(Me_3TACN)]Cl_2$ in in $D_2O$: 2.83 ppm (3H, $CH_3$) and 3.29 ppm (4H, $CH_2CH_2$).

Preparation of Granules and ADW Tablets

A typical recipe to prepare the granules according to the table below is as follows (example given for granule 3).

In an Eirich laboratory mixer (Type R02) 30 g of $[H_2Me_3TACN](HSO_4)_2$, 30 g of Mn(II) oxalate, 180 g of corn starch, and 960 g of TAED were added and mixed thoroughly at room temperature (2 minutes at 23.3-24.6° C.). Subsequently, the mixture was brought into a Hosokawa Bepex L200/30 compactor and the mixture was compacted twice at 3.8 $N/mm^2$ at 24.7-29.9° C. (the first time 15 min with a capacity of 9.9 kg/h and the second time 6 min with a capacity of 4.86 kg/h). After the compaction step, the material is milled with a Frewitt Type GLA.ORV.0215 mill to achieve 1.5 mm particle size. The particles thus obtained were then sieved and pressed to obtain particles with <1.5 mm size. The granules were then filtered over a metal mesh (size<0.2 mm), which resulted in a separation of the particles that were smaller than 0.2 mm. The particles that were too large (>1.5 mm) or too small (<0.2 mm) were compacted again as described above.

Overall yield was 83% (the remaining 17% were the fine particles (<0.2 mm) that were used again for the compaction as described above. Afterwards the particles were coated by 3 wt-% PVOH using a Fluisied Bed Glatt coater (GPCG 1.1). Visual inspection showed nearly colourless (off white) particles.

In a similar fashion, granules 1 and 2 were prepared using the hydrochloric acid salt of the ligand (abbr. as $[H_2L]Cl_2$ in the table) and using the oxalic acid salt of the ligand (abbreviated as $[H_2L](Hoxalate)_2$ in the table).

Two other reference granules were prepared using $MnCl_2$ instead of Mn-oxalate (granule 5) and $Mn(acetate)_2$ (granule 6).

Also as a reference the same granule 3 was prepared but now no PVOH coating step was performed (granule 4).

TABLE 1

Composition of granules according to the invention (granules 1-3) and of reference granules (granule 4 is the same as granule 3 without coating, granule 5 is the same as granule 3 using $MnCl_2$ instead of Mn-oxalate and granule 6 is the same as granule 3 using $Mn(acetate)_2$ instead of Mn-oxalate

| Granule 1 | Granule 2 | Granule 3 | Granule 4 (Reference) | Granule 5 (Reference) | Granule 6 (Reference) |
|---|---|---|---|---|---|
| Mn(II)oxalate 2.43 wt-% | Mn(II)oxalate 2.43 wt-% | Mn(II) oxalate 2.43 wt-% | Mn(II) oxalate 2.43 wt-% | Mn(II)dichloride 2.43 wt-% | Mn(II)di-(acetate) 2.43 wt-% |
| $[H_2L]Cl_2$ 2.43 wt-% | $[H_2L]$ $(Hoxalate)_2$ 2.43 wt-% | $[H_2L]$ $(HSO_4)_2$ 2.43 wt-% | $[H_2L]$ $(HSO_4)_2$ 2.43 wt-% | $[H_2L]$ $(HSO_4)_2$ 2.43 wt-% | $[H_2L]$ $(HSO_4)_2$ 2.43 wt-% |
| Corn Starch 14.55 wt-% | Corn Starch 14.55 wt-% | Corn Starch 14.55 wt-% | Corn Starch 14.55 wt-% | Corn Starch 14.55 wt-% | Corn Starch 14.55 wt-% |
| TAED 77.60 wt-% | TAED 77.60 wt-% | TAED 77.60 wt-% | TAED 77.60 wt-% | TAED 77.60 wt-% | TAED 77.60 wt-% |
| PVOH 3.0 wt-% | PVOH 3.0 wt-% | PVOH 3.0 wt-% | — | PVOH 3.0 wt-% | PVOH 3.0 wt-% |

L stands for $Me_3TACN$ or 1,4,7-trimethyl-1,4,7-triazacyclonane.

Additionally, a granule was prepared comprising $[H_2Me_3TACN](HSO_4)_2$ without Mn(II) oxalate catalyst, according to the following procedure: In an Eirich laboratory mixer (Type R02) 25.1 g of $[H_2Me_3TACN](HSO_4)_2$, 180 g of corn starch, and 800 g of TAED were added and mixed thoroughly at room temperature (2 minutes at 23.3-24.6° C.). Subsequently, the mixture was brought into a Hosokawa Bepex L200/30 compactor and the mixture was compacted at 24-34 $N/mm^2$ at 24.7-29.9° C.

After the compaction step, the material was milled with a Frewitt Type GLA.ORV. 0215 mill to achieve 1.5 mm particle size. The particles thus obtained were then sieved and pressed to obtain particles with <1.5 mm size. The granules were then filtered over a metal mesh (size<0.2 mm), which resulted in a separation of the particles that were larger than 0.2 mm. Afterwards the particles were coated by 3 wt-% PVOH using a Fluidized Bed Glatt coater (GPCG 1.1). Visual inspection showed nearly colourless (off white) particles.

The composition of this granule was:

| | |
|---|---|
| $[H_2L](HSO_4)_2$ | 2.42 wt-% |
| Corn Starch | 17.37 wt-% |
| TAED | 77.21 wt-% |
| PVOH | 3.0 wt-% |

L stands for $Me_3TACN$ or 1,4,7-trimethyl-1,4,7-triazacyclononane.

The composition of the ADW formulation, to which the granules comprising the manganese and ligand salts were added, is given in the table below.

The various granules whose composition is shown in table 1 were subsequently treated as follows. Each of the granule (5.95 g) was brought into a vessel that contained the ADW ingredients as indicated in the table 2 below (in total 950 g) and the ADW ingredients and the granular material were mixed well. Tablets of 20 g each were prepared by using a Carver Handtablettenpresse Model 4332 using a 1.5 ton press force.

The tablets containing the granules with PVOH coating (with granules 1, 2, 3, 5, 6) remained white/off-white whilst the tablets containing granule 4 (without PVOH coating), immediately showed brown spots after pressing and were therefore discarded.

TABLE 2

Composition of Automatic Dishwash Machine (ADW) formulation.

| Ingredient ADW formulation | g |
|---|---|
| Sodium citrate | 360 |
| Sodium carbonate | 250 |
| Sodium percarbonate | 150 |
| Weylclean SKS-6 | 50 |
| PEG 1500 Powder | 30 |
| PEG 6000 Powder | 20 |
| Sokalan PA25 Cl | 50 |
| Lutensol TO7 | 10 |
| Protease Blaze Evity 150T | 15 |
| Amylase Stainzyme Plus Evity 24T | 5 |

Cleaning Tests

The various tablets comprising the granules with Mn and ligand salts were tested for tea-stain removal of tea cups in an automatic dishwasher (Miele G 1223 SC GSL2) using said ADW formulation comprising the granules (45° C., standard programme R-time 2, at 21° DH water hardness, with 50 g of IKW soil—protocol. The assessment of the cleaning performance was made based on visual inspection, where 0% means no cleaning of the tea stains and 100% means complete removal of the tea stains.

All formulations comprising the granules 1-6 showed a very good cleaning performance under these conditions (complete cleaning of the tea cups, score of 10 on a scale of 1-10). The blank (no ligand and Mn salt present in the formulation) showed a performance of 4.8 on the same scale.

Storage Stability Tests

The tablets were stored in an oven at 50° C. and were then both tested for the cleaning performance and visually assessed (colour changes of the tablets).

The ADW tablets with granule 1-3 (Mn(II) oxalate and each ligand salt) did not change colour during this storage period.

Granules 4, 5 and 6 showed brown spotting, indicating that the Mn(II) salt has been oxidised to Mn(IV)$O_2$ species during the storage conditions/period.

The tea stain bleaching performance of granules 1, 2 and 3 were 10 (so identical to freshly prepared tablets). Granules 4, 5 and 6 showed a much worse tea-stain bleaching effect after storage: 6, 7 and 6.5 respectively.

These data showed clearly that combination of Mn(II) oxalate and $Me_3$TACN ligand salts are highly preferred over other Mn(II) salts in conjunction with the same ligand salts (1-3 vs 5 and 6).

Furthermore, comparing granule ADW tablets with 3 and granule 4 showed that the PVOH coating is essential to obtain storage stable tablets that remain the high bleaching activity.

Finally, the experiments detailed above clearly show that storage-stable granules can be obtained that comprise Mn(II) oxalate and a ligand salt, together with corn starch as absorbent and TAED, and coated with PVOH, that are colourless or off-white, yet delivering very good cleaning capabilities in the dishwashing cleaning tests, as opposed to the orange, pink or reddish granules comprising dinuclear Mn(III) or Mn(IV) complexes with the same ligand as disclosed in the prior art.

Also white granules were prepared successfully comprising $[H_2(Me_3TACN)](HSO_4)_2$ together with corn starch as absorbent and TAED and coated with PVOH, which can be used in laundry or dishwash detergent formulations.

The invention claimed is:

1. A granule that comprises:

a salt of composition $[HL]^+(X^{i-})_{1/i}$, $[H_2L]^{2+}(X^{i-})_{2/i}$, $[H_3L]^{3+}(X^{i-})_{3/i}$, $[(HL\text{-}BG\text{-}LH)]^{2+}(X^{i-})_{2/i}$, $[(HL\text{-}BG\text{-}LH_2)]^{3+}(X^{i-})_{3/i}$, $[(H_2L\text{-}BG\text{-}LH_2)]^{4+}(X^{i-})_{4/i}$, $[(H_3L\text{-}BG\text{-}LH_2)]^{5+}(X^{i-})_{5/i}$, and/or $[(H_3L\text{-}BG\text{-}LH_3)]^{6+}(X^{i-})_{6/i}$, whereby L is a monocyclic triamine, BG is a divalent organic bridge group, i is 1 or 2, and $X^{i-}$ is a mono- or divalent anion, wherein said granule comprises a coating agent, a polysaccharide absorbent, 0.02-25 wt-% of Mn(II) oxalate, and 0.1-25 wt-% of said salt;

or wherein said granule comprises a polysaccharide absorbent, 0.02-25 wt-% of said salt, and no or less than 0.01 wt-% of Mn.

2. The granule of claim 1, wherein L is a ring of formula (I) or L-BG-L is two rings of formula (I) linked via an organic divalent group RB:

(I)

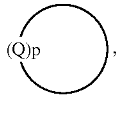, wherein:

Q = 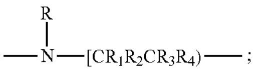;

p is 3;

R is independently selected from the group consisting of hydrogen, $C_1$-$C_{24}$-alkyl, $CH_2CH_2OH$ and $CH_2COOH$; or one R is linked as a divalent group RB to the nitrogen atom of another Q of another ring of formula (I), wherein RB is selected from a $C_2$-$C_6$ alkylene bridge, a $C_6$-$C_{10}$ arylene bridge or a bridge comprising one or two $C_1$-$C_3$ alkylene units and one $C_6$-$C_{10}$ arylene unit, which bridge may be optionally substituted one or more times with independently selected $C_1$-$C_{24}$ alkyl groups;

$R_1$, $R_2$, $R_3$, and $R_4$ are independently selected from H, $C_1$-$C_4$alkyl and $C_1$-$C_4$-alkylhydroxy; and whereby $X^{i-}$ is selected from $Cl^-$, $Br^-$, $I^-$, $NO_3^-$, $ClO_4^-$, $PF_6^-$, $BF_4^-$, $OCN^-$, $SCN^-$, $SO_4^{2-}$, $R'SO_4^-$, $R'COO^-$, R"oxalate$^-$, oxalate$^{2-}$, $CF_3SO_3^-$ and $R'SO_3^-$, whereby R' is selected from hydrogen, $C_1$-$C_8$ alkyl, phenyl and methyl substituted phenyl, and whereby R" is selected from H, Na, K and Li.

3. The granule of claim 2, wherein L is 1,4,7-trimethyl-1,4,7 triazacyclononane ($Me_3$-TACN) and L-BG-L is 1,2-bis(4,7-dimethyl-1,4,7-triazacyclonon-1-yl)-ethane ($Me_4$DTNE).

4. The granule of claim 1, wherein $X^-$ is selected from $Cl^-$, hydrogen oxalate and $HSO_4^-$.

5. The granule of claim 1, wherein the granule contains at least one of the additional ingredients selected from the group consisting of a water-soluble polymer; a filler; a salt; and a bleach activator; and wherein these ingredients are present in the following amounts 0-20 wt-% of a water-soluble polymer 0-85 wt-% of a filler;

0-85 wt-% of an inorganic salt;

0-90 wt-% of a bleach activator; wherein the percentages refer to the total amount of the granule.

6. The granule according to claim 5 comprising 0.5-25 wt-% of a coating agent and 0.02-25 wt-% of a salt of formula $[HL]^+(X^{i-})_{1/i}$, $[H_2L]^{2+}(X^{i-})_{2/i}$, $[(HL\text{-}BG\text{-}LH)]^{2+}(X^{i-})_{2/i}$, $[(HL\text{-}BG\text{-}LH_2)]^{3+}(X^{i-})_{3/i}$ and/or $[(H_2L\text{-}BG\text{-}LH_2)]^{4+}(X^{i-})_{4/i}$.

7. The granule according to claim 1, wherein the polysaccharide absorbent is selected from the group consisting of starch, modified starch, cellulose, and natural gum.

8. The granule according to claim 5, wherein the water-soluble polymer is selected from the group consisting of polyvinyl alcohol or polyvinylalcohol derivative.

9. The granule according to claim 5, wherein the filler is selected from the group consisting of an organic filler which is not an absorbent and an inorganic filler.

10. The granule according to claim 5, wherein the bleach activator is tetraacetylethylenediamine (TAED).

11. The granule according to claim 1, wherein the granule comprises a coating comprising a water-soluble polymer.

12. The granule according to claim 11 wherein the granule is coated with the coating agent.

13. A bleaching formulation comprising a granule of claim 1 and a peroxy compound or a precursor of a peroxy compound.

14. The bleaching formulation of claim 13, that comprises a granule of claim 1, and which further comprises, separately, a composition of a Mn salt.

15. A cleaning agent comprising a bleaching formulation of claim 13.

16. A salt of composition $[H_2L]^{2+}(Y^{i-})_{2/i}$, $[H_3L]^{3+}(X^{i-})_{3/i}$, $[(HL\text{-}BG\text{-}LH)]^{2+}(X^{i-})_{2/i}$, $[(HL\text{-}BG\text{-}LH_2)]^{3+}(X^{i-})_{3/i}$, $[(H_2L\text{-}BG\text{-}LH_2)]^{4+}(X^{i-})_{4/i}$, $[(H_3L\text{-}BG\text{-}LH_2)]^{5+}(X^{i-})_{5/i}$ or $[(H_3L\text{-}BG\text{-}LH_3)]^{6+}(X^{i-})_{6/i}$, whereby L is a monocyclic triamine, BG is a divalent organic bridge group, i is 1 or 2, X is a mono- or divalent anion, and $Y^{i-}$ is selected from $Br^-$, $I^-$, $NO_3^-$, $ClO_4^-$, $PF_6^-$, $BF_4^-$, $OCN^-$, $SCN^-$, $SO_4^{2-}$, $R'SO_4^-$, $R'COO^-$, R"oxalate$^-$, oxalate$^{2-}$, $CF_3SO_3^-$; and $R'SO_3^-$, whereby R' is selected from hydrogen, $C_1$-$C_8$ alkyl, phenyl or methyl substituted phenyl, and whereby R" is selected from H, Na, K and Li.

17. The salt according to claim 16, wherein L is a ring of formula (I) or L-BG-L is a compound having two rings L of formula (I) linked via an organic divalent group RB:

(I)

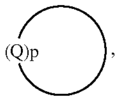, wherein:

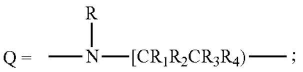

p is 3;

R is independently selected from the group consisting of hydrogen, $C_1$-$C_{24}$-alkyl, $CH_2CH_2OH$ and $CH_2COOH$; or one R is linked as a divalent group RB to the nitrogen atom of another Q of another ring of formula (I), wherein RB is selected from a $C_2$-$C_6$ alkylene bridge, a $C_6$-$C_{10}$ arylene bridge or a bridge comprising one or two $C_1$-$C_3$ alkylene units and one $C_6$-$C_{10}$ arylene unit, which bridge may be optionally substituted one or more times with independently selected $C_1$-$C_{24}$ alkyl groups; and $R_1$, $R_2$, $R_3$, and $R_4$ are independently selected from H, $C_1$-$C_4$-alkyl and $C_1$-$C_4$-alkylhydroxy; and whereby $X^{i-}$ is selected from $Cl^-$, $Br^-$, $I^-$, $NO_3^-$, $ClO_4^-$, $PF_6^-$, $BF_4^-$, $OCN^-$, $SCN^-$, $SO_4^{2-}$, $R'SO_4^-$, $R'COO^-$, R"oxalate$^-$, oxalate$^{2-}$, $CF_3SO_3^-$ and $R'SO_3^-$,and $Y^{i-}$ is selected from $Br^-$, $I^-$, $NO_3^-$, $ClO_4^-$, $PF_6^-$, $BF_4^-$, $OCN^-$, $SCN^-$, $SO_4^{2-}$, $R'SO_4^-$, $R'COO^-$, R"oxalate$^-$, oxalate$^{2-}$, $CF_3SO_3^-$ and $R'SO_3^-$, whereby R' is selected from hydrogen, $C_1$-$C_8$ alkyl, phenyl and methyl substituted phenyl, and whereby R" is selected from H, Na, K and Li.

18. The salt according to claim 16, wherein the salt is a diprotonated salt, L is 1,4,7-trimethyl-1,4,7-triazacyclonane and $Y^{i-}$ is selected from hydrogen sulfate and hydrogen oxalate.

19. The granule according to claim 11, wherein the granule comprises a polymer selected from the group consisting of polyvinyl alcohol or polyvinylalcohol derivative.

* * * * *